US011900402B2

(12) United States Patent
Breunig

(10) Patent No.: US 11,900,402 B2
(45) Date of Patent: Feb. 13, 2024

(54) CHARACTERIZING GROUPS BASED ON GEOLOCATIONS REPORTED BY POPULATIONS OF MOBILE COMPUTING DEVICES

(71) Applicant: PlaceIQ, Inc., New York, NY (US)

(72) Inventor: Drew Breunig, New York, NY (US)

(73) Assignee: PlaceIQ, Inc., New York, NY (US)

( * ) Notice: Subject to any disclaimer, the term of this patent is extended or adjusted under 35 U.S.C. 154(b) by 0 days.

(21) Appl. No.: 17/190,316

(22) Filed: Mar. 2, 2021

(65) Prior Publication Data

US 2021/0279750 A1   Sep. 9, 2021

Related U.S. Application Data

(60) Provisional application No. 62/984,151, filed on Mar. 2, 2020.

(51) Int. Cl.
| | |
|---|---|
| *G06Q 30/02* | (2023.01) |
| *G06Q 30/0204* | (2023.01) |
| *G06Q 30/0201* | (2023.01) |
| *H04W 4/021* | (2018.01) |
| *G06F 16/29* | (2019.01) |
| *H04W 4/029* | (2018.01) |
| *G06F 21/60* | (2013.01) |

(52) U.S. Cl.
CPC ......... *G06Q 30/0205* (2013.01); *G06F 16/29* (2019.01); *G06F 21/602* (2013.01); *G06Q 30/0201* (2013.01); *H04W 4/021* (2013.01); *H04W 4/029* (2018.02)

(58) Field of Classification Search
None
See application file for complete search history.

(56) References Cited

U.S. PATENT DOCUMENTS

| | | |
|---|---|---|
| 8,489,596 B1 | 7/2013 | Milton et al. |
| 9,275,114 B2 | 3/2016 | Milton et al. |
| 9,589,280 B2 | 3/2017 | Milton et al. |
| 10,218,808 B2 | 2/2019 | Milton et al. |
| 10,235,683 B2 | 3/2019 | Milton et al. |
| 10,262,330 B2 | 4/2019 | Milton et al. |

(Continued)

OTHER PUBLICATIONS

Dietterich, "Machine Learning for Sequential Data: a Review", pp. 1-15 (2002).

(Continued)

*Primary Examiner* — Alan Torrico-Lopez
(74) *Attorney, Agent, or Firm* — KDW FIRM PLLC

(57) ABSTRACT

Provided is a process including segmenting a representation into a set of tiles and obtaining a set of geolocations. The process includes, for each tile, determining a respective amount of devices within the respective tile to form a set of weights. The process also includes assigning each tile of a subset of the set of tiles with a set of groups based on the set of weights, building a first map based on the set of groups, and building a second map by traversing the first map. The process also includes determining a first and second subset of devices by traversing the second map, determining whether a second tile is to be assigned to a first or second group based on the first and second subset of devices, assigning the second tile to the first group, and building a region map comprising the set of groups.

19 Claims, 8 Drawing Sheets

(56) References Cited

U.S. PATENT DOCUMENTS

| | | | |
|---|---|---|---|
| 2016/0203211 A1* | 7/2016 | Milton | H04L 51/20 |
| | | | 705/14.58 |
| 2016/0360360 A1 | 12/2016 | Jones | |
| 2018/0143999 A1 | 5/2018 | Jones | |
| 2018/0330197 A1* | 11/2018 | Gonguet | G06K 9/6267 |
| 2020/0284896 A1 | 9/2020 | Henretty et al. | |

OTHER PUBLICATIONS

Jiang, "Ranking Spaces for Predicting Human Movement in a Urban Envrionment", vol. 3, pp. 1-11 (Feb. 2008).
"Basic Linear Algebra Subprograms", Wikipedia, pp. 1-11 (Jun. 29, 2021).
Warden, "Why GEMM is at the heart of deep learning", Uncategorized, pp. 1-12 (Apr. 20, 2015).

* cited by examiner

CHARACTERIZING GROUPS BASED ON GEOLOCATIONS REPORTED BY POPULATIONS OF MOBILE COMPUTING DEVICES

CROSS-REFERENCE TO RELATED APPLICATIONS

This application claims priority to, and the benefit of, U.S. Provisional Patent Application 62/984,151, filed on 2 Mar. 2020, titled "CHARACTERIZING GROUPS BASED ON GEOLOCATIONS REPORTED BY POPULATIONS OF MOBILE COMPUTING DEVICES." The entire content each of the aforementioned patent-filings are hereby incorporated by reference.

BACKGROUND

1. Field

The present disclosure relates generally to computational geometry and, more specifically, to computer systems configured to perform device-based geographic mapping.

2. Description of the Related Art

The practice of computer-implemented demographic mapping is critical for various applications in a diverse array of fields such as population health management, environmental control, and marketing. The rise in the number of internet-connected mobile computing devices and applications provides ever-increasing volumes of data that can be used to associate human behaviors with geographic positions, dramatically increasing the volume and potential accuracy of data available to mapping demographics to a region.

SUMMARY

The following is a non-exhaustive listing of some aspects of the present techniques. These and other aspects are described in the following disclosure.

Some aspects include a process that includes segmenting a geographic region representation into a first set of geographic unit tiles, each geographic unit tile being a different geographic area of the geographic region representation; obtaining a set of geolocations at which mobile devices among a set of mobile devices are detected based on device signals transmitted by the mobile devices; for each geographic unit tile in the first set of geographic unit tiles, determining a respective amount of mobile devices observed within the respective geographic unit tile based on the obtained set of geolocations; for each geographic unit tile in the first set of geographic unit tiles, determining a respective weight based on the respective amount of mobile devices observed within the respective geographic unit tile to form a set of weights; assigning each tile of a subset of the first set of geographic unit tiles with a set of groups based on the set of weights, wherein assigning each tile of the subset of the first set of geographic unit tiles comprises assigning a first geographic unit tile in the first set of geographic unit tiles to a first group in the set of groups; building a first hash map based on a set of device identifiers, the first set of geographic unit tiles and the set of groups, wherein the first hash map comprises one or more key-value pairs; building a second hash map by traversing the first hash map, wherein: keys of the second hash map are based on the set of device identifiers, keys correspond to values in the second hash map, and values of the second hash map comprise paired elements; determining a first subset of devices among the set of mobile devices and a second subset of devices among the set of mobile devices by traversing the second hash map, wherein the first subset of devices is associated with the first group, and wherein the second subset of devices is associated with a second group that is also from the set of groups; determining whether a second geographic unit tile is to be assigned to the first group or the second group based on a comparison between the first subset of devices and the second subset of devices; assigning the second geographic unit tile to the first group in response to a determination that the second geographic unit tile is to be assigned to the first group; and building a region map comprising the set of groups, wherein each of the first set of geographic unit tiles indicates one of the set of groups.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
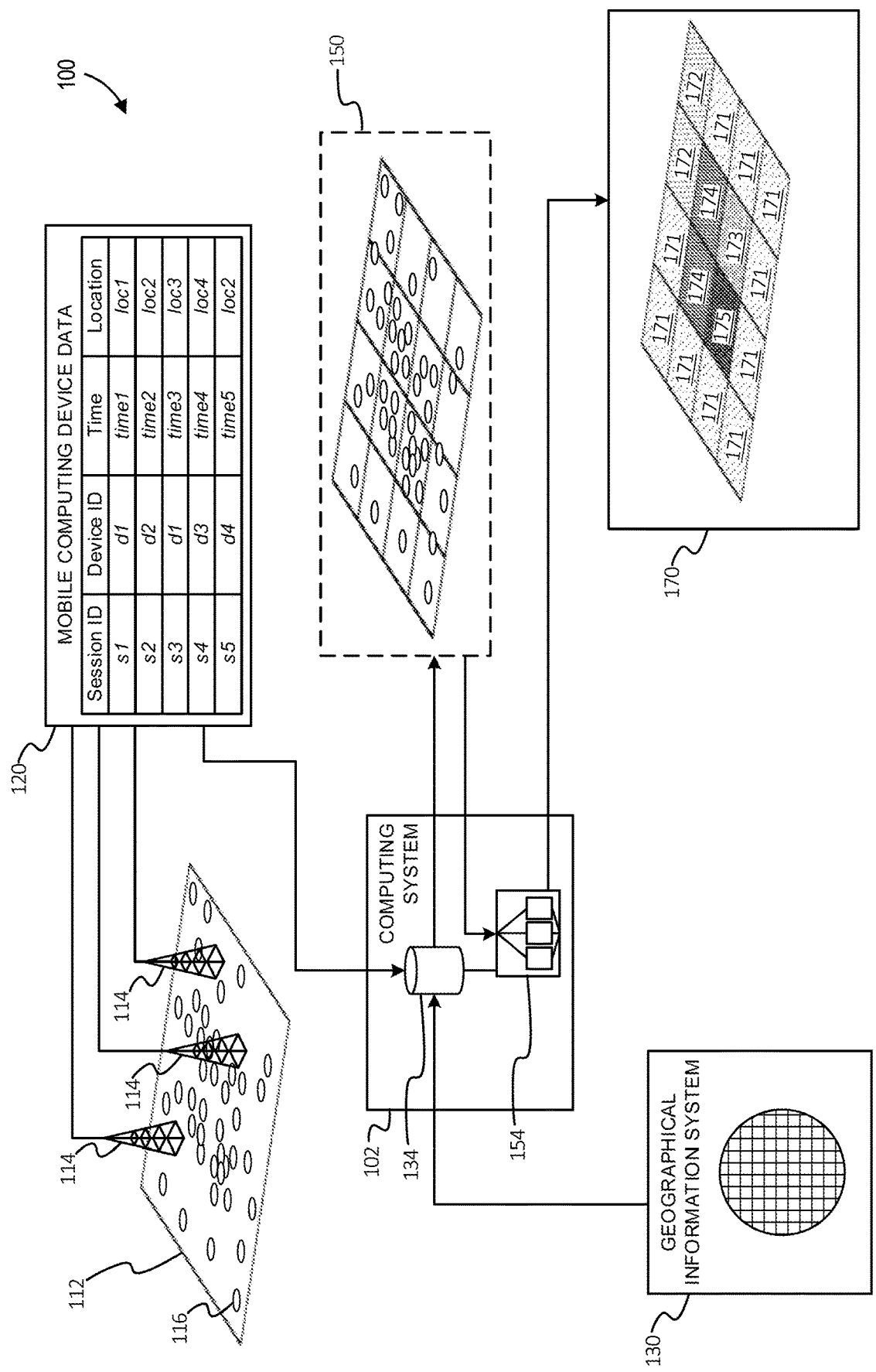
FIG. 1 is a schematic diagram of a first computing environment in which various components for demographic mapping may be implemented with the present techniques, in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases just as importantly, recognize problems overlooked (or not yet foreseen) by others in the field of geographical analytics. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Many traditional demographics mapping rely on quantizations of geographic areas. In some cases, areas are divided into geographic unit tiles based on physical or technical limitations or government-mandated divisions. These geographic unit tiles can then be index to, or otherwise assigned, an appropriate demographic value based on available data and combined to form demographic groups of a region.

Conventional geographic maps may be inadequate when mapping demographics of a moving population. This inadequacy can stem from the lack of any dependence between the boundaries of conventional geographic unit tiles on the demographics metrics used determine a demographic of a population. In some cases, conventional geographic unit tiles might be too large to accurately capture the geographic distribution of a demographic. In other cases, the geographic unit tiles of a region map might have boundaries that obfuscate important geospatial data associated with movement. Furthermore, while a demographic metric may be based on human behaviors outside of a domicile, some geographic maps label populations based on home addresses. The reliance of on conventional geographic maps can render ineffective the implementation of studies, technology, or regulations by inappropriately allocating too many or too few resources to improperly shaped demographic groups. None of which is to suggest that these or any other techniques are disclaimed.

Some embodiments implement a signal-based mapping system to generate region maps that describe movements and distributions of a population of mobile computing devices. The signal-based mapping system can generate a demographic region map (or psychodemographic region map) that divides a geographic region into different groups based on wireless signals using a set of demographic mapping operations. Some embodiments may determine a set of geographic unit tiles of a region, where a subset of the set of geographic unit tiles may be assigned to a set of groups. Using one or more statistical or deterministic optimization methods, the groups may be allowed to spread to and compete with each other for sets of geographic unit tiles until an equilibrium stage is achieved and a resulting region map is generated. Some embodiments partition a space (like a two-dimensional geographic area) into disjoint subsets and some embodiments form overlapping subsets of areas that each satisfy various demographic criteria, wherein the disjoint subsets may be stored using various data structures. For example, some embodiments may partition a space into data structures such as a binary space-partitioning tree, quadtree, octree, k-d tree, bins, R-tree, and the like.

The resulting region map can be used for a variety of purposes. In some cases, population health decision-makers may direct medical care providers to specific areas represented by a geographic unit tile based on an illness tracking application. In other cases, the region map can associate two geographically separated regions together based on daily transportation patterns for the purposes of directing transportation development or expansion projects. In some embodiments, the region map can be used to determine the possibility of enclave groups, wherein an enclave group may be spatially enclosed by a larger group but is effectively isolated based on the behaviors of the population within the enclave group. In some embodiments, the region map may be queried for determining whether to bid on an ad auction associated with a demographic group of the region map or for determining what content to display based on a query result. For example, a mobile computing device may query a region map to determine that the mobile computing device is in a demographic group A and displays a message stating "welcome to group A" in response to the query result.

FIG. 1 shows an example of a computing environment 100 having a computer system 102 operative to generate (e.g., form a new instance or modify an extant instance) region maps that include demographic groups. In some embodiments, the computer system 102 builds (for example, instantiates or updates) region maps based on wireless signals generated by mobile computing devices 116 distributed across a geographic region 112 and data obtained from a geographic information system 130. Accordingly, these components are described in this sequence, starting with inputs, and concluding with outputs.

The geographic region 112 can include regions of various sizes. For example, the geographic region 112 can include a city block, a city, a county, a state, a country, a continent, and the like. In some embodiments, the mobile computing devices 116 can represent real-world mobile computing devices. The mobile computing devices 116 can include any of a variety of different types of computing devices having an energy storage device (e.g., a battery) and being capable of communicating with the signal receivers 114. In some embodiments, the signal receivers 114 can include wireless area network or a cellular network. In some cases, the mobile computing devices 116 are handheld mobile computing devices, such as smart phones, tables, or the like, or the mobile computing devices 116 can be laptop computers or other special-purpose computing devices, such as a vehicle-based computer (e.g., an in-dash navigation system). It should be noted, however, that the present techniques are not limited to mobile computing devices, and other computing devices may also generate data useful for forming mapped demographic groups. For instance, set-top boxes, gaming consoles, or Internet-capable televisions may be geolocated based on IP address, and data from user interactions with these devices may be used to update mobile computing devices data 120.

The mobile computing devices data 120 may include information about external or internal services by which the location of the mobile computing device may be obtained. For example, the mobile computing device may have a built-in satellite-based geolocation device (for instance a global-positioning system (GPS) device or components operative to obtain location from other satellite-based systems, such as Russia's GLONASS system or the European Union's Galileo system). In some embodiments, location may be obtained based on the current wireless environment of the mobile computing device, for example by sensing attributes of the wireless environment (e.g. SSIDs of wireless hotspots, identifiers of cellular towers and signal strengths, identifiers of low energy Bluetooth beacons, and the like) and sending those attributes to a remote server capable of identifying the location of the mobile computing device. In some embodiments, the location may be obtained based on an identifier of a network node through which the mobile computing device connects to the Internet, for example by geocoding an IP address of a wireless router or based on a location of a cellular tower to which the mobile computing device is connected. For example, the location may be expressed as a latitude and longitude coordinate.

Locations may be obtained in real time from the mobile computing devices 116. Alternatively, or in addition, some embodiments may obtain a mobile computing device's location histories e.g., from data stored on the mobile computing devices. Each location history may include records of geographic locations of a respective mobile computing device and when the mobile computing device was at each location. In some embodiments, a location may have an associated location identifier, wherein a location identifier may be used to determine the location. For example, a location identifier be a string that can be referenced to determine a location. In some cases, a location history may include records of location or location identifiers over a relatively long duration of time, such as longer than an hour, day, week, or month. In some embodiments, a location history for a respective mobile computing device may include a plurality (e.g., more than 10 or more than 100) of location records, where each location record including a geographic location or location identifier and the time at which the mobile computing device was at the location. Locations may be expressed in a variety of formats with varying degrees of specificity. For example, a location may be expressed as a latitude and longitude coordinates, as identifiers indicating a geographic unit tile, or in some other format for uniquely specifying places. Locations may be identified with reference to a unique identifier of a place of interest in an ontology of places in a geographic information system.

The connection data between one of the mobile computing devices 116 and the signal receivers 114 can be collected in mobile computing devices data 120. The mobile computing devices data 120 can include values representing various types information, such as a session identifier ("session ID") that indicates a specific session during which the connection between a mobile computing device and a signal receiver exists, a device identifier ("device ID") that identifies a specific one of the mobile computing devices 116, one or more signal times, or a location from which the wireless signal is sent. In some embodiments, the signal times can represent a session start time, duration, or end time. In some embodiments, the location can be a specific geolocation of the device obtained from a GPS. Alternatively, or in addition, a location may be associated with the signal receiver. For example, for the data session s1, if a device d1 located at location loc1 initiates a connection with a cell tower located at location loc2, the location associated with the data session s1 may be associated with loc2 if the location loc1 is not obtained from the device d1. Alternatively, a or in addition, a location may be represented by one or more boundaries (e.g. a geofence). For example, a location may be represented by a set of latitude and longitude positions and circular boundaries around the latitude and longitude positions. As another example, a location may be represented by a set of coordinates indicating vertices of a polygon enclosing an area, where any position inside the area is in the location. Locations may be reported in ad requests, by wireless service providers, by native application providers, or the like, and end-users may be afforded the opportunity to opt-in or opt-out, depending on the design.

In addition to any geographic information available from the mobile computing devices data, data from the geographic information system 130 can be obtained from a data source in communication with the computer system 102. In some embodiments, data from the geographic information system 130 may be obtained from a third-party application executing on a server via an application protocol interface (API). For example, the geographic data can be retrieved from the third-party library Google Earth via the Google Earth API. The data from the geographic information system 130 can include domain-specific information, such as store locations, home addresses, census block group (CBG) information, and the like. For example, the data from the geographic information system 130 can include values representing vectors and points which can be used to determine boundaries of neighborhood subdivisions and office locations. Once obtained, the data from the geographic information system 130 can be stored by the computer system 102.

The geographic information system 130 may be configured to provide information about geographic locations in response to queries specifying a location of interest. In some embodiments, the geographic information system 130 organizes information about a geographic area by segmenting (or otherwise dividing) the geographic area into area units, called unit tiles, that are mapped to subsets of the geographic area. In some cases, the unit tiles correspond to square units of area having sides that are between 10-meters and 1000-meters, for example approximately 100-meters per side, depending upon the desired granularity with which a geographic area is to be described. Alternatively, the unit tiles can be shaped based on government-established units, such as municipal borders, the Military Grid Reference System (MGRS), or CBGs. In other examples, the unit tiles have other shapes, e.g., hexagon shapes that are arranged in a two-dimensional hexagonal packing layout. In some embodiments, the geographic information system 130 includes a plurality of unit tile records, each unit tile record corresponding to a different subset of a geographic area. Each unit tile record may include an identifier, an indication of geographic area corresponding to the unit tile (which for regularly size unit tiles may be the identifier), one or more indications of a demographic group(s) to which the unit tile may be assigned.

The data from the geographic information system 130 location data may be recorded and the mobile computing devices data 120 can reside on a local environment, a cloud computing environment, a distributed computing environment, or other architecture. The computer system 102 may include or be in communication with a set of data stores 134, where the set of data stores 134 may store the mobile computing devices data 120, the data from the geographic information system 130, and other data. The computer system 102 may use the data stored in the set of data stores 134 to build a geographic region representation 150 of the geographic region 112, wherein the geographic region representation 150 is partitioned into the geographic unit tiles. A geographic unit tile can be any geographic area that is distinct from other geographic areas. In some embodiments, geographic unit tiles may overlap with each other, be disjoint in area, form regular tiles, form irregular tiles. In some embodiments, geographic unit tiles may be hierarchical, wherein a first geographic unit tile encompasses a second geographic unit tile. In some embodiments, a geographic unit tile in a first level of a hierarchy may share a label with a geographic unit tile in a second layer of the hierarchy. Specific shapes, arrangements and other features of geographic unit tiles may be selected based specific mapping goals. For example, a set of geographic unit tiles representing a region may include only non-overlapping, tiling geographic unit tiles shaped in squares or hexagons. Alternatively, as further described below, a set of geographic unit tiles may include a first subset of geographic unit tiles associated with the boundaries of a candidate place of interest and a second subset of regularly shaped geographic unit tiles that may share or encompass a portion of at least one of the first subset of geographic unit tiles.

In some embodiments, the computer system 102 may be responsible for processing location, time, and other data based on wireless signals from a large number of mobile computing devices such as hundreds of thousands or even hundreds of millions of mobile computing devices distributed across a large geographic region such as a city, state, country, or continent. For example, some embodiments may process a plurality of petabytes worth of data from a region over the course of multiple days to generate region maps that indicate groups assigned to the geographic unit tiles of the region. To process data at the scales possible using the methods described in this disclosure, some embodiments may implement concurrent processing frameworks, like Hadoop, Apache Spark™, Apache Storm™, or Apache Flink™. Alternatively, or in addition, some embodiments may use data warehousing platforms such as Google BigQuery™, DataTorrent RTS™, or Apache Hydra™. In addition, specific instructions may be implemented using programming languages compatible with one or more of the above-mentioned frameworks and platforms such as Hadoop and Kotlin. Furthermore, while some embodiments of the computer system 102 may use a single data center, other embodiments of the computer system 102 may include a plurality of data centers. In some embodiments, geolocation data or other data associated with the geolocations associated with device or wireless signals may be stored in a tree structure that include a position in a Hilbert curve (or Morton curve, Z-curve, or other spatial indices, like other space-filling curves) representation of the location data. For example, some embodiments may store positions in a region map in a Hilbert R-tree. Storage of the data in a lower-dimensional representation of position information may accelerate processing or increase memory use efficiency.

In some embodiments, the computer system 102 can include or be in communication with a parallel computing system 154, where the geographic region may be partitioned into a set of parallel computing sub-regions. Each of the set of parallel computing sub-regions can be independently processed by a processor in the parallel computing system 154 to determine a portion of a region map. After each iteration, the portions of the region map may be combined into a region map 170. In some embodiments, the region map 170 may include a first set of geographic unit tiles 171, a second set of geographic unit tiles 172, a third set of geographic unit tiles 173, a fourth set of geographic unit tiles 174, and a fifth set of geographic unit tiles 175, where each of the sets of geographic unit tiles 171-175 can be combined to form a region map that includes a representation for the geographic region 112. The geographic unit tiles in the sets of geographic unit tiles 171-175 can be assigned to a set of groups by the computing environment 100. For example, the first set of geographic unit tiles 171 may be assigned to a first group M1, a second set of geographic unit tiles may be assigned to a second group M2, a third set of geographic unit tiles may be assigned to a third group M3, a fourth set of geographic unit tiles may be assigned to a fourth group M4, a fifth set of geographic unit tiles may be assigned to a fifth group M5, and a sixth set of geographic unit tiles may be assigned to a sixth group M6.

The computer system 102 may be executed on one or more of the computers described below with reference to FIG. 8. These computers may include a tangible, non-transitory, machine-readable medium, such as various forms of memory storing instructions that when executed by one or more processors of these computers (or some other data processing apparatus) cause the computers to provide the functionality of the computer system 102 described herein. The components of the computer system 102 are illustrated as discrete functional blocks, but it should be noted that the hardware and software by which these functional blocks are implemented may be differently organized, for example, code or hardware for providing the this functionality may be intermingled, subdivided, conjoined, or otherwise differently arranged.

Figure 2:
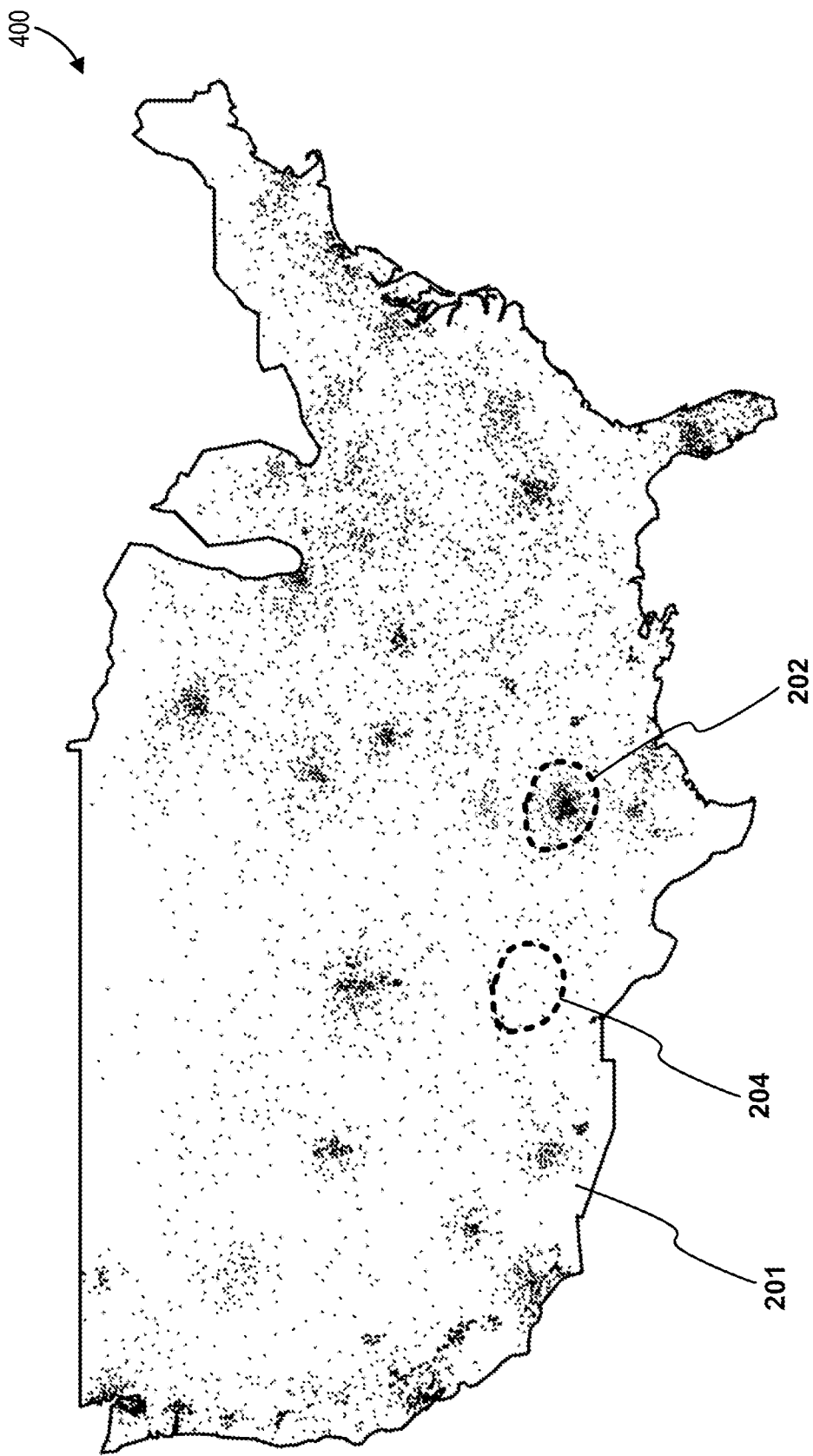
FIG. 2 depicts a geographic region representation, wherein the geographic region representation includes points representing high wireless signal density areas, in accordance with some embodiments.

FIG. 2 depicts a geographic region representation, where the geographic region representation includes points representing areas in which signal density exceeds a threshold. FIG. 2 a geographic region representation 200, wherein the geographic region representation 200 includes a representation of the continental United States. The various points may represent positions at which wireless signals exceed a density threshold and form one or more wireless signal clusters. For example, the point 201 can represent a wireless signal cluster. During a seeding operation described below, a count of wireless signals or wireless signal clusters in a geographic unit tile may be correlated with a weight, where a weight may represent a strict value, a range in an interval, and the like. An increase in a weight associated with a geographic unit tile may increase the probability that the associated geographic unit tile is assigned a group during the seeding operation. Thus, in some embodiments, an area that includes a large number of wireless signal clusters may have a greater probability of containing a geographic unit tile that is assigned to a group during a seeding operation. For example, a first dashed area 202 can have a greater probability of containing a geographic unit tile that is assigned to a group during a seeding operation than a second dashed area 204, where the second dashed area 204 includes fewer wireless signal clusters than the first dashed area 202.

Figure 3:
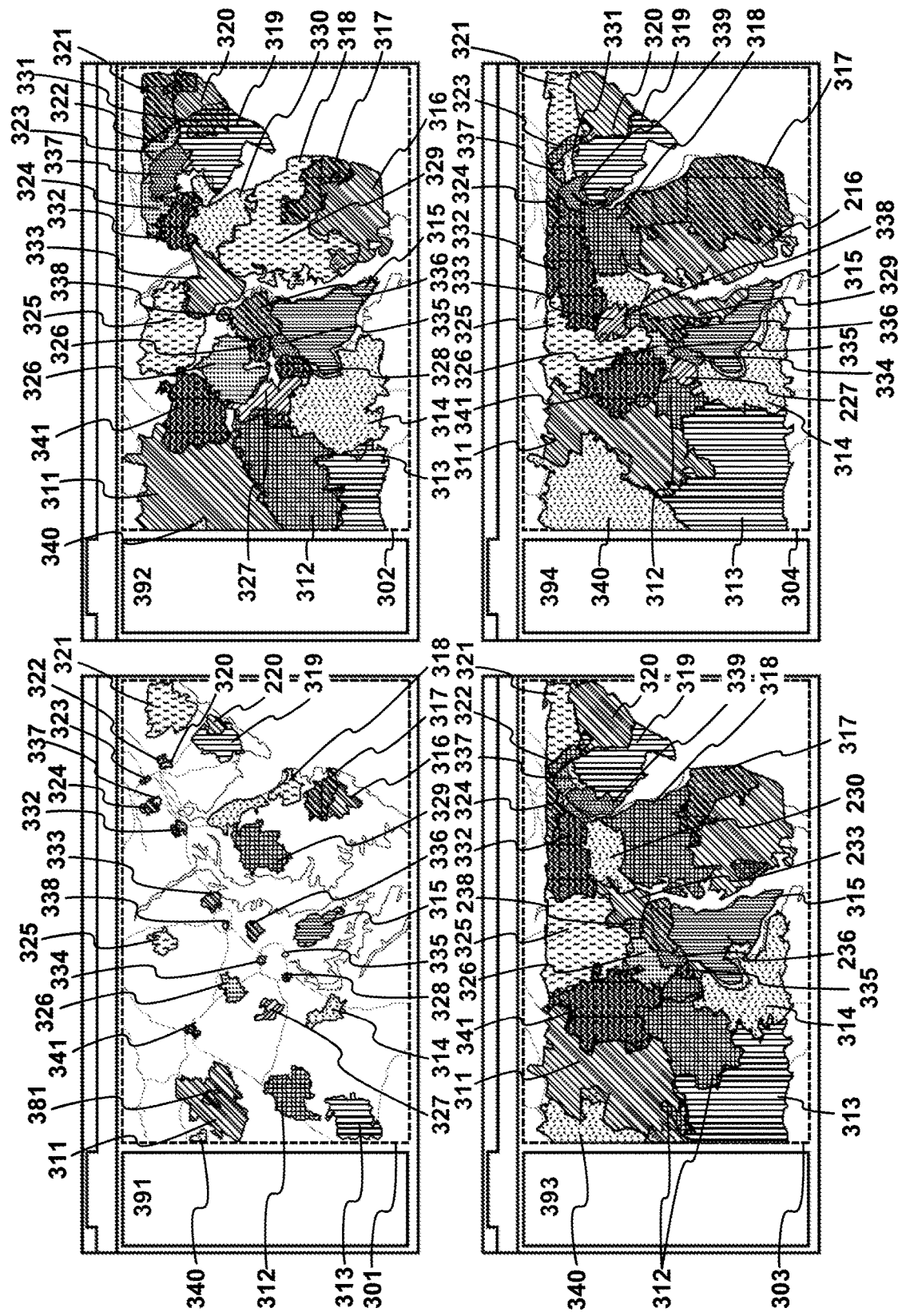
FIG. 3 depicts a set of region maps, where each of the region map have a set of assigned groups, in accordance with some embodiments.

FIG. 3 depicts an evolution of program state in a set of region maps, where each of the region maps have a set of assigned groups, in accordance with some embodiments. The upper left window 391 depicts a region map 301 divided into a set of geographic unit tiles that are shaded or textured to represent assignment to the groups 311-340. Initially, some tiles may be unassigned. Each of the shaded areas represent groups 311-340, wherein varying sizes and shapes in the groups 311-340 can be a result of the differences in sizes and geometry of the geographic unit tiles assigned to their respective group. In some embodiments, each of the groups 311-340 can have grown from an initial set of geographic unit tiles assigned during a seeding operation after a first set of map growth operations described further below in the process 400. For example, the geographic unit tile 381 inside the first group 311 can be the geographic unit tile assigned to the first group 311 during the seeding operation, where the other geographic unit tiles shown in the first group 311 can be the result of additional map growth operations.

The upper right window 392 depicts the region map 302. The region map 302 can be built after applying a second set of growth operations to the region map 301. As can be observed in the region map 302, many of the groups 311-340 may have expanded, where geographic unit tiles that were previously not assigned to any of the groups 311-340 are now assigned to them. For example, in comparing the first group 311 as depicted in the region map 301 and the first group 311 as depicted in the region map 302, the first group 311 has increased in size after the second set of growth operations.

The lower left window 393 depicts the region map 303. The region map 303 can be built after applying a third set of growth operations to the region map 302. As can be observed in the region map 303, each of the groups 311-340 have further changed shapes and no unassigned geographic unit tiles remain. Furthermore, a subset of the groups has lost geographic unit tiles assigned to them and may even no longer include the geographic unit tiles originally assigned to them during a seeding operation. For example, the group 327 depicted in the region map 303 has lost geographic unit tiles to its neighboring groups, such as groups 312, 314, 326, and 341. In addition, some groups may be split into separate, non-contiguous areas during map growth operations. For example, the group 312 is shown split into two different areas, where the first group 311 and third group 313 divide the two areas of the group 312.

The lower right window 394 depicts the region map 304. The region map 304 can be built after applying a fourth set of growth operations to the region map 303. In some embodiments, the region map 304 can represent a final region map that is used to determine that operations to build a demographic map are complete. Similar to the map growth results shown in the region map 303, a subset of the groups have grown smaller due to losing geographic unit tiles to other groups. Alternatively, while the groups shown in FIG. 3 are allowed to lose their initial seed geographic unit tile, some embodiments may prevent a group from losing its seed geographic unit tile. For example, some embodiments may determine that a first geographic unit tile was assigned to a first group during a seeding operation and, in response to any instructions to re-assign the first geographic unit tile to a second group, prevent the first geographic unit tile from being re-assigned to the second group.

Figure 4:
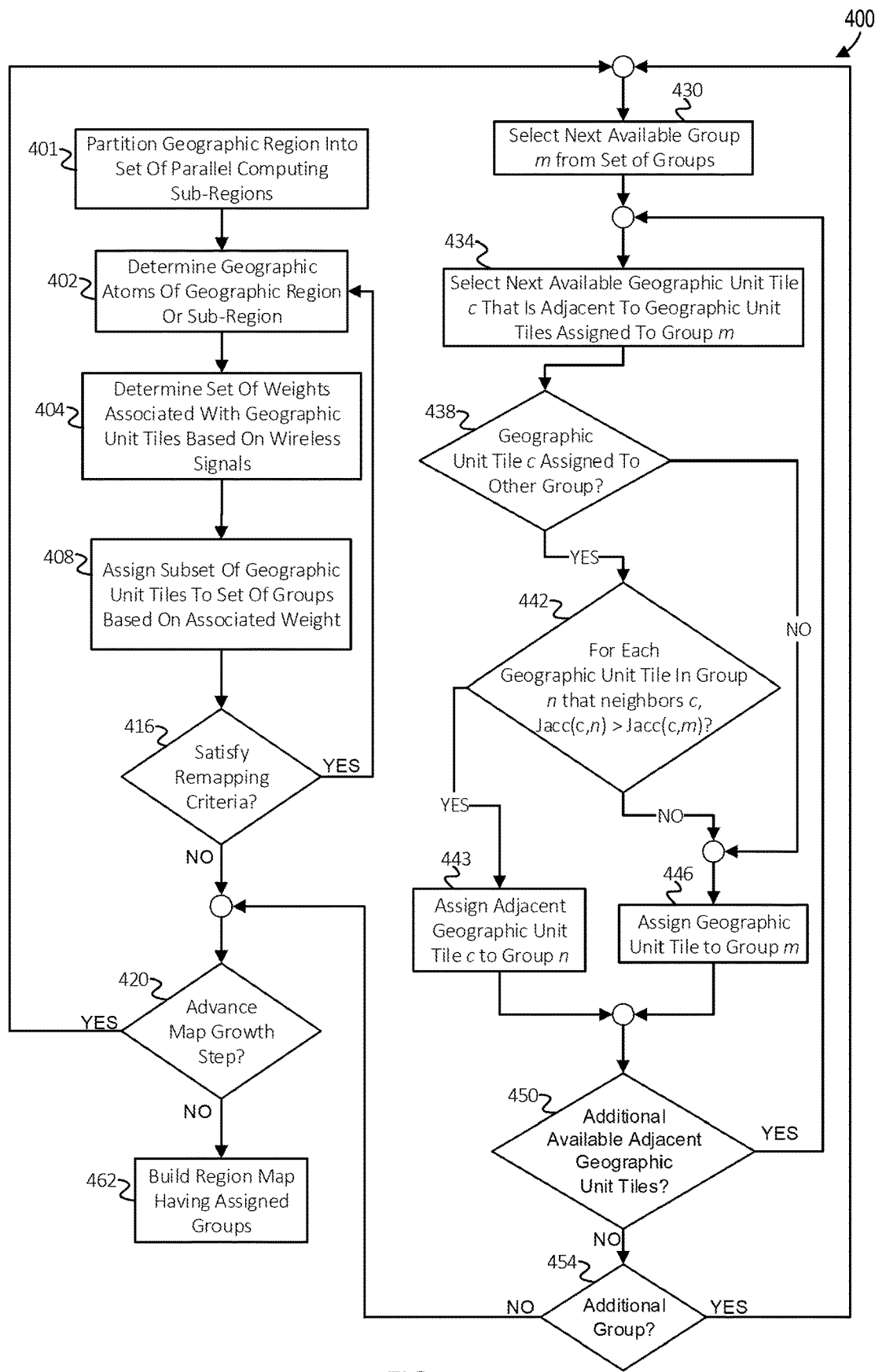
FIG. 4 is a flowchart of a process that may be implemented in the computing environments of FIG. 1 to build a region map, in accordance with some embodiments.
Figure 5:
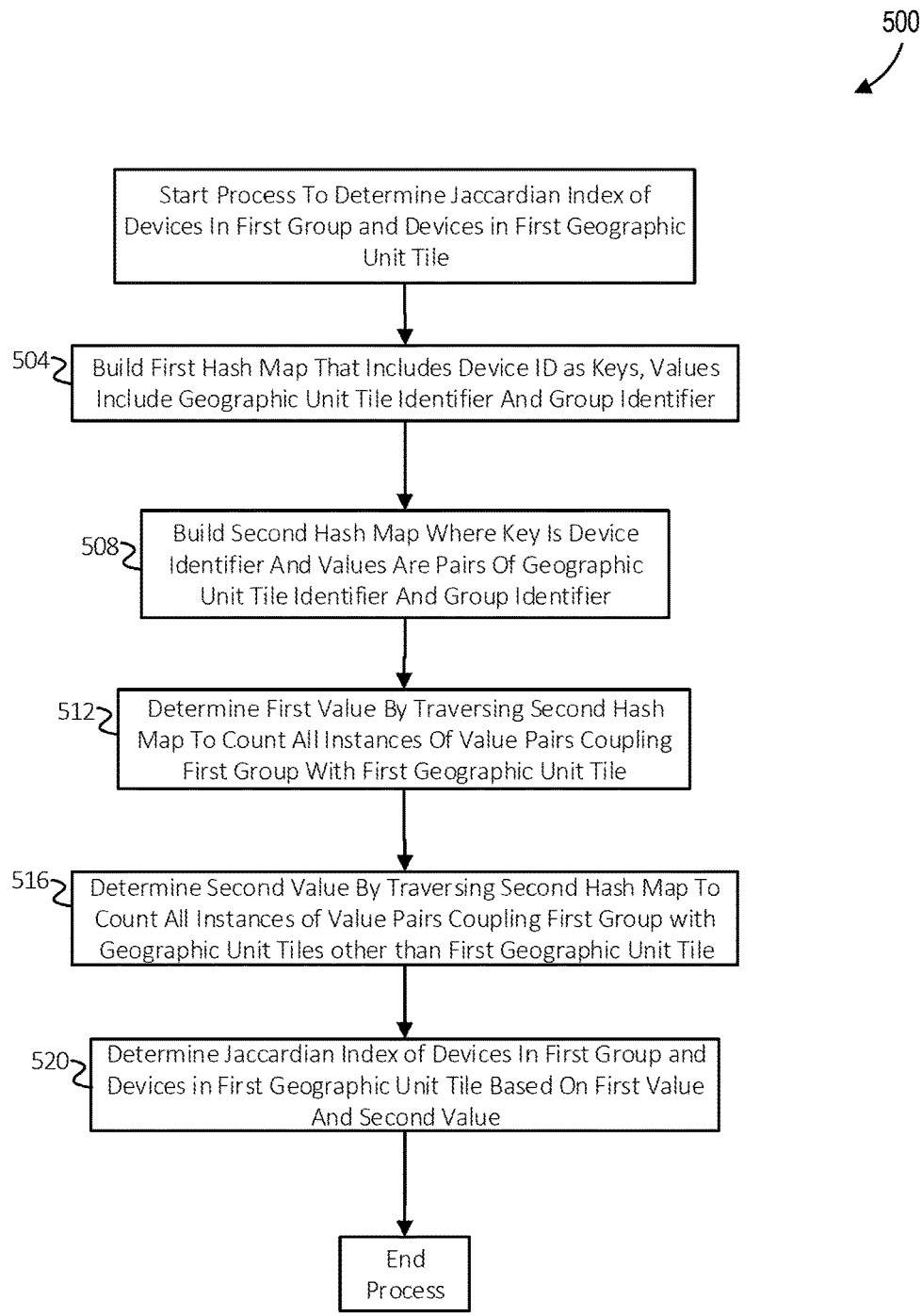
FIG. 5 is a flowchart of a process that may be implemented in the computing environments of FIG. 1 to compute Jaccard Index values, in accordance with some embodiments.

FIGS. 4-5 are flowcharts of processes that may be implemented in the computing environments of FIG. 1 to build region maps in accordance with some embodiments. For example, the mapping system may execute one or more routines in the computing environment 100. In some embodiments, the various operations of the process 400 and process 500 may be executed in a different order, operations may be omitted, operations may be replicated, additional operations may be included, some operations may be performed concurrently, some operations may be performed sequentially, and multiple instances of the process 400 and process 500 may be executed concurrently, none of which is to suggest that any other description herein is limited to the arrangement described. In some embodiments, the operations of the process 400 and process 500 may be effectuated by executing program code stored in one or more instances of a machine-readable non-transitory medium, which in some cases may include storing different subsets of the instructions on different physical embodiments of the medium and executing those different subsets with different processors, an arrangement that is consistent with use of the singular term "medium" herein.

The process 400 depicts operations using a mapping system to build a region map where some or all of the region map are assigned to a set of groups based on wireless signals, in accordance with some embodiments. Some embodiments may include segmenting a geographic region representation into a set of parallel computing sub-region representations, as indicated by operation 401. These parallel computing sub-regions may be processed by different sets of processors for concurrent computations. The partitioning of a geographic region representation into a set of parallel computing sub-region representations allows each of the parallel computing sub-region representations to be processed concurrently using parallel computing methods, which can decrease the time required to generate a region map that includes a set of geographic unit tiles assigned to different groups. Each of the parallel computing sub-region representations may be processed similarly to the set of geographic region or sub-regions described below in the operations 402-408.

In some embodiments, the process 400 includes determining a set of initial geographic unit tiles of a geographic region representation or sub-region representation, as indicated by the operation 402. The geographic unit tiles may be of any shape and be either heterogeneous or homogeneous in size and shape. For example, a geographic unit tile may comprise a square-shaped voxel in the geographic region representation ("gloxel"). As an additional example, the geographic unit tiles may be blocks of areas having a same interval of latitude and longitude boundaries (e.g. each block covers 0.1 degrees along the latitude direction and 0.1 degrees along the latitude direction) on the projection of the Earth. Determining a set of initial geographic unit tiles may be performed by having a data model of an application in which geographic unit tiles index information about geographic entities.

In some embodiments, a region representation of a region may be modified before or during operations of the process 400. Some embodiments may generate a connection between a first portion of a geographic region representation and a second portion of the geographic region representation. The connection between the two portion indicates that the two portions are to be treated as if they were adjacent to each other. For example, some embodiments may include forming a connection between a first geographic and a second geographic unit tile even if the regions represented by the geographic unit tiles are non-contiguous.

Some embodiments may modify the geographic region representation based on images of a region using object recognition methods. For example, a satellite image of a region can be analyzed using a deep learning computer vision system to detect, locate, and classify the presence of a bridge in the satellite image between a first region portion represented by a first geographic unit tile and a second region portion represented by a second geographic unit tile. Based on the detection of the bridges, the first geographic unit tile and the second geographic unit tile may be designated as connected in memory.

Some embodiments may also include removing a portion of the geographic region representation. In some embodiments, one or more portions of the geographic region representation may be selected for removal. For example, a user may select a particular geographic unit tile for removal via graphical user interface. The geographic region representation may then be updated to no longer include the particular geographic unit tile.

Some embodiments may include determining a set of weights associated with the set of geographic unit tiles that is based on a set of wireless signals, as indicated by operation 404. In some embodiments, each of the weights associated with set of geographic unit tiles may be based on a set of obtained wireless signals, and each of the set of geographic unit tiles may have their own respective associated weight. For example, the weights may be based on wireless signal density values, the sizes of clusters of wireless signals, a count of the clusters of wireless signals (either visits or unassociated signals), a count of the total number of wireless signals in each respective unit tile, counts of dwell-based values, wireless signal trajectories in the set of geographic unit tiles, or the like. For example, each of the set of weights may be determined based on a count of clusters of wireless signals. Various clustering methods may be used to determine the clusters and their associated cluster centroids. In some embodiments, for each respective geographic unit tile, a K-means or density-based spatial clustering of applications with noise (DBSCAN) clustering method may be used to determine a set of clusters of wireless signals or wireless signal trajectories within the respective geographic unit tile. For example, a first geographic unit tile may have four clusters of wireless signal visits and a second geographic unit tile may have ten clusters of wireless signal visits. The first geographic unit tile may have a corresponding weight equal to four and the second geographic unit tile may have a corresponding weight value equal to ten. In some embodiment, a weight may represent a specific interval in a range. For example, a weight may be the interval 151 to 201.

Some embodiments may determine whether a device or associated wireless signal is inside of a geographic unit tile or other enclosed shape (like a polygon bounding a place of interest) using a point-in-polygon algorithm, such as a ray casting algorithm or a winding number algorithm. For example, a cluster centroid may be determined to be in a geographic unit tile by applying a ray casting algorithm to count how many times one or more rays intersecting the cluster centroid also intersects with a boundary. Some embodiments may determine that the point is in geographic unit tile if the intersection count using the ray casting algorithm results in an odd number. Alternatively, or in addition, some embodiments may determine whether a device or associated wireless signal is inside of a particular geographic unit tile by first storing the location associated with the signal to a one-dimensional value in a Hilbert space or other space-filling curve, where the Hilbert space or other space-filling curve is mapped to the region, and then determining if the one-dimensional value is in a value range mapped to a particular geographic unit tile.

Some embodiments may filter the wireless signals before determining the set of weights. For example, some embodiments may filter the wireless signal based on a set of target locations, wherein only wireless signals not detected within the set of target locations are discarded. For example, wireless signals may be filtered such that wireless signals not located within either a domicile or a commercial building are discarded before determining the set of weights. Alternatively, or in addition, some embodiments may filter the wireless signals by a particular frequency range. For example, some embodiments may obtain a frequency range between 1500-2500 MegaHertz (MHz) and filter the wireless signals to discard all wireless signals from the data that is not within this frequency range. Once filtered, operations to determine the set of weights may be determined based only on the wireless signals having a frequency range of 1500-2500 MHz. While the example of 1500-2500 MHz is used in this example, other frequency ranges are possible, such as a frequency range between 0 Hz and 4000 MHz, such as 300-500 MHz, 600-900 MHz, 800-2000 MHz, and the like. In some embodiments, the wireless signals may remain unfiltered, or may be filtered in before or during a different operation of the process 400. In some embodiments, the wireless signals may be filtered during a different operation, such as during an operation of the process 500 or 700.

Some embodiments may include assigning a subset of geographic unit tiles in the set of sub-region representations to a set of groups based on the set of weights, as indicated by operation 408. In some embodiments, the total count of the set of groups may be a preset value. For example, the count of the set of groups may be set to 1000. The subset of geographic unit tiles may be assigned using various seeding algorithms based on the weights associated with the set of sub-region representations. In some embodiments, a seeding algorithm may randomly (e.g., pseudo-randomly with a RDRAND is an instruction) select a set of initially-selected positions in a geographic region representation, where geographic unit tiles having a greater weight is correlated with having a greater likelihood of becoming one of the initially-selected positions. As used in this disclosure, a first weight represented by a first interval may be greater than a second weight represented by a second interval if the range of the first interval is greater than the range of the second interval.

For example, when selecting a unit tile for a first group, some embodiments may perform a random selection without replacement of a geographic unit tile amongst a set of geographic unit tiles. Some embodiments may randomly select a value between the range of 0 to 1000. Each of the set of geographic unit tiles have a respective associated weight equal to an interval within the range of 0 to 1000, and whichever geographic unit tile has the interval that includes the randomly-selected value is assigned to a corresponding group. For example, the set of geographic unit tiles may include a first geographic unit tile in a heavily populated area having an associated weight equal to an interval of 104 to 186 and a second geographic unit tile in a lightly populated area having an associated weight equal to an interval of 187 to 189. Thus, if the randomly-selected value is 156, the first geographic unit tile may be assigned to the first group. Each of the geographic unit tiles that include one of the set of positions may be assigned to a different group.

As described above, some embodiments may partition the geographic region into a set of geographic sub-regions. In some embodiments, a first set of parallel computing sub-region representations may be generated from the geographic region representation before performing seeding operations to assign groups to geographic unit tiles. For example, a region may be divided into a first set of sub-region representations that includes a first sub-region and a second sub-region. Using the operations described above, the first sub-region may then be seeded such that a first set of preliminary geographic unit tiles in the first sub-region and a second set of preliminary geographic unit tiles in the second sub-region are each assigned to one of a set of groups. Some embodiments may then store the group assignment of this subset of geographic unit tiles or the group positions associated with each the group assignments in a data storage system such as such as the set of data stores 134.

Some embodiments may then re-partition the region into an adjusted set of parallel computing sub-regions, where the sub-region representations of the adjusted set of parallel computing sub-region representations do not have the same boundaries as the first set of parallel computing sub-regions, e.g., tiles may be re-assigned. For example, one of the adjusted set of parallel computing sub-regions may be a third sub-region, where the third sub-region includes both a portion of the first sub-region and the second sub-region described above. This third sub-region may then be assigned to a set of processors for concurrent processing with other sub-regions during parallel computing operations. Some embodiments may perform map growth operations for each of the adjusted set of sub-region representations while using the stored geographic unit tiles assigned above as the initially assigned geographic unit tiles. Alternatively, some embodiments may perform map growth operations for each of the adjusted set of sub-region representations while using a newly-generated set of geographic unit tiles, where each of the newly-generated set of geographic unit tiles assigned to a group contain one of the stored group positions. By first assigning the subset of geographic unit tiles into groups using a first set of sub-region representations and then re-dividing the region into a shifted set of sub-region representations for map growth operations, edge distortions and other seeding biases may be avoided.

In some embodiments, the process 400 may include determining whether one or more remapping criteria are satisfied, as indicated by the operation 416. Satisfying one or more remapping criteria may trigger operations to re-determine the geographic unit tiles of a map or re-assign a subset of the geographic unit tiles to the set of groups. For example, a remapping criterion may include determining whether two geographic unit tiles that are assigned to different groups border or each other within a city boundary. In response to a determination that two geographic unit tiles that are assigned to different groups border or each other within a city boundary, the groups may be re-assigned to a different subset of geographic unit tiles in the set of sub-region representations. For example, in response to a determination that two geographic unit tiles that are assigned to different groups border or each other within a city boundary, some embodiments may return to the operation 402. In some embodiments, instead of proceeding to the operation 402, some embodiments may proceed to the operation 408 or 412. In some embodiments, the process 400 may be repeated several times with different initial random assignments of groups to geographic unit tiles, and a result with a best-performing result according to an objective function may be selected among the multiple repeats to guard against a local optima of group assignments. Otherwise, operations of the process 400 may proceed to operation 420.

Some embodiments may include determining whether or not a map growth operation should be advanced, as indicated by the operation 420. A map growth operation comprises various operations that may assign or re-assign one or more geographic unit tiles to a group in a geographic region representation. If a geographic region representation is partitioned in a set of parallel computing sub-regions, the map growth operations may operate concurrently in each of the set of parallel computing sub-regions. Some embodiments may determine to advance a map growth operation based on whether a number of iterations satisfy an iteration threshold. For example, some embodiments may stop map growth after 500 iterations. Alternatively, or in addition, some embodiments may determine to advance the map growth operation based on whether any geographic unit tiles were assigned to a different group in a recent mapping growth operation. For example, some embodiments may stop further map growth operations if no geographic unit tiles are re-assigned to a different group during a map growth operation.

After seeding the region map with groups, some embodiments may include using a Jaccardian comparison to compare each of a set of neighboring geographic unit tiles for each of the groups as described below in the operations 430-454. Alternatively, other methods may be used to determine map growth operations. In some embodiments, probabilistic methods may be used to determine the group assignment of geographic unit tiles in a region map. Such probabilistic methods may include an entropy method, simulated annealing method, quantum annealing method, and the like. For example, some embodiments may use a simulated annealing method to build a region map by minimizing the cost function result (or maximizing a reward function) from a geographic unit tile that neighbors a plurality of neighboring groups.

Tiles may be interactively assigned and reassigned to and among groups to reduce various cost functions based on aggregate properties of the map in a current or next iteration. For example, some embodiments may include a cost function that, when applied to a particular geographic unit tile, changes value based on the group assignment of the particular geographic unit tile such that a value is reduced when the re-assignment results in greater differences between the mobile computing devices assigned to the particular geographic unit tile and its neighboring geographic unit tiles. Specific types of the cost function may include quadratic cost functions, cross-entropy cost functions, exponential cost functions, Gini impurity, Itakura-Saito distance cost functions, and the like. Or other types of objective functions, like a reward function, may be used to similar ends.

In some embodiments, methods to build a region map may be based on amounts of mobile computing devices associated with a group or geographic unit tile. An amount of mobile computing devices associated with a group is determined based on an amount of mobile computing devices associated with any of the geographic unit tiles assigned to the group. An amount of mobile computing devices for a geographic unit tile may be determined from wireless signals transmitted by the mobile computing devices or results based on the wireless signals. In some embodiments, the amount of mobile computing devices may be based on a count of visits to a geographic unit tile or group comprising a set of geographic unit tiles. For example, the amount of mobile computing devices in a geographic unit tile may increase for each visit from a mobile computing device whether or not the visits are from the same mobile computing device. Alternatively, in some embodiments, an amount of mobile computing devices may be based on the count of distinct mobile computing devices to have visited the geographic unit tile. For example, in some embodiments, the amount of mobile computing devices associated with a geographic unit tile may increase when visits to the geographic unit tile are from different mobile computing devices and may not increase for visits to the geographic unit tile from the same mobile computing device. The methods described herein may be applicable to various types of amounts of mobile computing devices, unless otherwise stated. In addition, some determinations of an amount of mobile computing devices may determine an amount of mobile computing devices based on a centralized tendency of visits or a frequency of visits over an interval of time, such as an hour, a day, a week, a month, and the like. Furthermore, while the amount of mobile computing devices used in some embodiments may be a numerical value, other embodiments may determine the amount of mobile computing devices in a geographic unit tile as a categorical value.

Some embodiments may include selecting a next available group m from the set of groups, as indicated by operation 430. In some embodiments, the next available group m may be selected by looping through a set of groups, where m represents the selected group. For example, a set of groups may include groups in the array [k, n, p, q, r], and some embodiments may loop through each element of the array. Alternatively, some embodiments may limit the size or otherwise prevent a subset of the groups from growing. For example, if the set of groups include groups in the array [k, n, p, q, r], and if the group q exceeds a pre-set maximum size, a determination may be made that group q is not allowed to grow in a current growth operation. In response, the loop through the array [m, n, p, q, r] may be skip group q and the operations described further below may be performed for only the groups in the array [k, n, p, r] for a current growth operation.

Some embodiments may include selecting a next available geographic unit tile c that is adjacent to the geographic unit tiles assigned to group m, as indicated by operation 434. The next available geographic unit tile c may be selected from the set of geographic unit tiles that are not assigned to the group m described above in the operation 430, where the set of geographic unit tiles borders one or more geographic unit tiles that are assigned to group m. For example, if the geographic unit tile c1 and c2 are assigned to group m and the geographic unit tile c3 is assigned to group n, then some embodiments may select the geographic unit tile c3.

Some embodiments may include determining whether a geographic unit tile c is assigned to another group other than group m, as indicated by operation 438. In some embodiments, the geographic unit tile c may be determined be assigned to another group by looking at a hash map, data table, or other set of values stored in a data structure. For example, some embodiments may refer to a data table indexed by geographic unit tile identifiers to determine whether the geographic unit tile c is assigned to another group. As used in this disclosure, a hash map can include any data structure that implements an associative array abstract data type, where the structure can map keys to values. In some embodiments, a hash map may include key-value pairs that may be implemented in various ways. For example, in the Java programming language, a hash map may be instantiated as an object of the class "Hashmap," an object of the class "Hashtable," or an object of various other hash map classes.

Some embodiments may include determining, for each geographic unit tile n that neighbors the geographic unit tile c, whether Jacc(c,n) is greater than Jacc(c,m), as indicated by operation 442. The determination of values for Jacc(c,m) or Jacc(c,n) may be performed using various methods. For example, some embodiments may determine Jacc(c,m) by traversing a data structure to determine an amount of mobile computing devices assigned to the group m and an amount of mobile computing devices observed in the geographic unit tile c. Specific operations to determine a Jaccardian index Jacc(c,m) are described further below for the process 500. If any neighboring value Jacc(c,n) is greater than Jacc(c,m), operations of the process 400 may proceed to an operation 443. Otherwise, operations of the process 400 may proceed to an operation 446.

While the Jaccardian index is used in the operation 442, other measures of mutual information may be used instead. Some embodiments may determine, for each unit tile c adjacent to a boundary between two groups, which of the two group assignments for unit tile c would result in a greater measure of mutual information. For example, a first measure of mutual information for a unit tile c assigned to a group g may be based on the mobile device identifiers appearing in the unit tile c and the set of mobile device identifiers assigned to the group g, and a second measure of mutual information for a unit tile c assigned to a group f may be based on the mobile device identifiers appearing in the unit tile c and the set of mobile device identifiers assigned to the group f Some embodiment may compute a measure of mutual information resulting from the assignment of the respective unit tile to each group, where the measure of mutual information may be a normalized measure of mutual information such as a Jaccardian index (as described above), Sorensen-Dice coefficient, Tversky index, and the like. Some embodiments may then compare these two measures of mutual information and select the assignment that results in the greater measure of mutual information. Some embodiments may assign tiles at the boundaries between groups to the group where the most of its device identifiers appear the most often and away from groups where its device identifiers appear less often, thereby forming groups with boundaries that tend to minimize cross-group co-occurrences of device identifiers. For embodiments where measures of mutual information are used, if the measure of mutual information corresponding to a group of a neighboring unit tile is greater than the measure of mutual information associated with a currently-assigned group, operations of the process 400 may proceed to an operation 443. Otherwise, operations of the process 400 may proceed to an operation 446.

In some cases, when computing measures of mutual information, transfers of data within a memory hierarchy of a computer system (e.g., from persistent storage, to dynamic random access memory, to L3 cache, to L2 cache, to processor registers) may be relatively expensive, as transfers are often slow, and often memory space may be particularly limited closer to the processor. For instance, access to registers of a CPU or graphics processing unit may be relatively fast, while space may be relatively limited. Level 2 and level 3 cache may offer increasing magnitude of volume, trading off slower read times. Similarly, system memory, like dynamic random access memory, may offer even greater volume, though access times may be several orders of magnitude slower. Matrices processed by some embodiments may be too large to concurrently fit into the higher levels of a memory hierarchy. As a result, during matrix operations, portions of the matrix may be swapped in and out of the higher levels of memory hierarchy, which may account for a substantial portion of the computing resources, e.g., time and memory, consumed.

Some embodiments may accelerate the computation of measures of mutual information, like Jaccardian indices or Tversky indices, with basic linear algebra subprograms, like level 1, 2, or 3 commands described in the article "Basic Linear Algebra Subprograms" which is available at "https:// en.wikipedia.org/wiki/Basic_Linear_Algerbra_Subprograms", which is incorporated herein by reference. Some embodiments may compute measures of mutual information with vector registers and single-instruction multiple data instructions supported by the processor. For example, some embodiments may compute Jaccardian indices with the techniques described in "Basic Linear Algebra Subprograms." Some embodiments may multiply matrices by invoking the GEMM (GEneral Matrix to Matrix Multiplication) function of a BLAS library, as described in the following article available at "https://petewarden.com/2015/

04/20/why-gemm-is-at-the-heart-of-deep-learning/" and incorporated herein by reference: Warden, Pete. (2015) "Why GEMM is at the heart of deep learning."

In some embodiments a blocking algorithm may be applied to multiply two matrices (e.g., when at least one is a relatively dense matrix), to improve the functioning of the computer system and reduce the amount of time spent shifting data back and forth between levels of a memory hierarchy. In some embodiments, the matrices (e.g., one or both) may be segmented into blocks, each having contiguous positions of values within the matrix, for instance, those values that are both in the first 4 or 8 columns and in the first 4 or 8 rows might constitute one block. In some embodiments, block size may be selected based on the amount of available memory at various levels of a memory hierarchy, so that a block can fit within a targeted level of the hierarchy, like the level 2 or level 3 cache. Some embodiments may iterate through the blocks, loading the blocks into a higher level of the memory hierarchy from a lower level, before performing operations with that block. In some embodiments, a given block, after being loaded into the higher level the memory hierarchy, may be applied to update each implicated value of a resulting matrix (e.g., a product). In some cases, the values of the matrix may be initialized to zero, and then may accumulate updates as blocks are processed. After all blocks have been so processed, and the output matrix may be complete. In some cases, updating values is performed by summing an existing value with products of values computed with the higher level of the memory hierarchy.

Some embodiments may include assigning the adjacent geographic unit tile c to group n, as indicated by operation 443. Some embodiments may assign the adjacent geographic unit tile c to group n by setting a record in a data table associated with the geographic unit tile c to indicate an association between the geographic unit tile c with the group n. Alternatively, or in addition, the geographic unit tile c may be stored as a data object with a set of properties, where a group assignment property of the data object may set to indicate the group n.

Some embodiments may include assigning the adjacent geographic unit tile c to group m, as indicated by operation 446. Operations to assign the geographic unit tile to group m can be similar to the operations used to assign the geographic unit tile to group n described above for the operation 443.

Some embodiments may include determining whether additional adjacent geographic unit tiles are available, as indicated by operation 450. In some embodiments, the determination of whether additional adjacent geographic unit tiles are available may be implicitly implemented while searching for an available adjacent geographic unit tile. For example, some embodiments may determine that an additional adjacent geographic unit tile is available by selecting a next group in an array of adjacent unit tiles until the end of the array of adjacent geographic unit tiles is reached. If the selection results in error message or results in a selection of an already-selected geographic unit tile, some embodiments may determine that no additional adjacent geographic unit tile is available. If an additional adjacent geographic unit tile is available, operations of the process 400 may return to the operation 434. Otherwise, operations of the process 400 may proceed to the operation 454.

Some embodiments may include determining whether additional groups are available, as indicated by operation 454. In some embodiments, the determination of whether additional groups are available may be implicit to an implementation of searching for an available group. For example, an operation can determine that an additional group is available by selecting a next group in an array of groups until the end of the array of groups is reached. If the selection results in error message or results in a selection of an already-selected group, some embodiments may determine that no additional group is available. If an additional group is available, operations of the process 400 may return to the operation 434. Otherwise, operations of the process 400 may return to the operation 420.

Some embodiments may include building a region map having the assigned groups, as indicated by operation 460. In response to a determination that the map growth operation should not be advanced, some embodiments may build a region map, where the region map includes a representation of the assigned groups. For example, the region map may include a set of geographic unit tile identifiers and each of their corresponding assigned groups. In some embodiments, building a region map may include generating a new region map. Alternatively, or in addition, building a region map may include modifying an existing region map. In addition, while the process 400 depicts the region map being built after the end of map growth operations, some may update the region map after every iteration of a map growth operation.

In some embodiments, the region map may be represented as a graphical image (like a bit-map in which pixel intensity values serve as group identifiers), a flat file, a data object, and the like. The region map may be used to determine values such as a visit rate, where a visit rate is an estimate of how frequently a location would be visited. For example, after obtaining an input location, some embodiments may determine that the input location is in a first geographic unit tile associated with a first group and then determine a count of the devices or wireless signals associated with the first group. Some embodiments may then determine a visit rate based on the count of the devices or wireless signals.

Some embodiments may use the resulting region map to repeat one or more operations of the process 400, wherein the portion of a region represented by a group is used as the new region. For example, a first set of geographic unit tiles may form a first portion of a region, where each of the first set of geographic unit tiles is assigned to a first group. Some embodiments may then repeat operations of the process 400 and segment the first portion into a second set of geographic unit tiles, determine weights associated with the second set of geographic unit tiles, and seed the second set of geographic unit tiles with set of sub-groups. For example, some embodiments may segment the first portion into a second set of geographic unit tiles. The second set of geographic unit tiles may include a third geographic unit tile that is within the first portion of the region and not identical to any of the first set of geographic unit tiles.

Some embodiments may generate a distinctiveness value, where a distinctiveness value for a particular group is correlated with how distinct a particular first group is in comparison to other groups in a region map. In some embodiments, the distinctiveness value for the particular group may be determined based on the count of mobile computing devices that are detected to be in geographic unit tiles of the particular group and the count of mobile computing devices that are detected in the region as a whole. For example, the distinctiveness value of a first group that is assigned to a first set of geographic unit tiles can be a ratio. This ratio can be 1.0 if none of the mobile computing devices detected to be in the first set of geographic unit tiles are detected in geographic unit tiles not assigned to the first group. This ratio may decrease as more mobile computing devices are determined to be in the first set of geographic unit tiles and in other mobile computing devices. In some embodiments, the distinctiveness value for a first group may be a ratio of a first value to a second value. For example, the first value may be based on a first set of wireless signals sent by a first set of mobile computing devices associated with the first group, where each of the first set of wireless signals were sent from a geographic unit tile assigned to the first group. The second value may be based on a second set of wireless signals, where each of the wireless signals are also sent by the first set of mobile computing devices but can be sent from anywhere in a region instead of being limited to the geographic unit tiles assigned to the first group. Some embodiments may return the process 400 to an earlier operation such as operations 402 or 408 in response to one or more distinctiveness values not satisfying a distinctiveness threshold.

The process 500 depicts example operations using a mapping system to build a region map where some or all of the region map are assigned to a set of groups based on wireless signals. While the process 500 refers to calculations based on an amount of mobile computing devices in a geographic unit tile or group, other amounts of mobile computing devices may be used. For example, some embodiments may use a count of wireless signals or a count of device visits in place of the count of mobile computing devices. Some embodiments may include building a first hash map that uses device identifiers as keys, and where geographic unit tiles and group identifiers are values, as indicated by block 504. In some embodiments, the device identifiers may be hashed before use, where hashing may anonymize devices or reduce the amount of data used to store the identifiers. For example, a device identifier consisting of sixteen characters may be hashed to a hash value consisting of eight characters, which may both reduce memory consumption as well as increase differential privacy for users associated with the device identifiers. As used in this disclosure, building a hash map can include forming a new hash map or updating an existing hash map. In some embodiments, the keys of the hash map may be device identifiers obtained based on metadata of wireless signals associated with the devices, wherein at least one of the values of each respective value of each key includes at least one of the geographic unit tiles the device was detected in and the group the device was assigned to. For example, a hash map may be represented by Table 1, where the column "Device" represents devices, the column "Geographic Unit tile" represents geographic unit tiles, and the column labeled "Group" represents different groups:

TABLE 1

| Device | Geographic Unit tile | Group |
|---|---|---|
| D1 | C1 | M1 |
| D2 | C2 | M1 |
| D3 | C3 | M2 |
| D1 | C2 | M1 |
| D4 | C5 | M2 |

Some embodiments may include building a second hash map that uses device identifiers as keys and includes arrays of value pairs, where each value pair couples an unit tile identifier with a group identifier, as indicated by block 508. After building the second hash map, the value pairs may be flat-mapped (i.e. modified such that the dimensionality of data is reduced) to lay out each pair. For example, the data in Table 1 can be traversed to build the second hash map represented by Table 2 below, wherein the values of Table 2 can be flat-mapped to generate a flat-map represented by Table 3:

TABLE 2

| Device | Geographic Unit tile |
|---|---|
| D1 | [{M1, C1}, {M1, C2}] |
| D2 | [{M1, C2}] |
| D3 | [{M2, C3}] |
| D4 | [{M2, C5}] |

TABLE 3

| Device | Geographic Unit tile |
|---|---|
| M1 | C1 |
| M1 | C2 |
| M2 | C3 |
| M2 | C5 |

Some embodiments may include determining a first value by traversing the second hash map to count all instances of the value pairs coupling the first group with the first geographic unit tile, as indicated by an operation 512. For example, by traversing the hash map represented by at least one of Table 2 and Table 3 above, the value pair [{M1, C1}] may be determined. Thus, based on the data available from Table 2, the first value can be set to one, since the count of mobile computing devices that are both observed to be a part of group M1 and seen in the geographic unit tile C1 is equal to one.

Some embodiments may include determining a second value by traversing the second hash map to count all instances of the value pairs coupling the first group with geographic unit tiles other than the first geographic unit tile, as indicated by an operation 516. Based on the data available from Table 3, the second value can be set to two, since the count of mobile computing devices that are observed to be a part of group M1 and not in the geographic unit tile C2 is equal to two. This can be observed by traversing the hash map represented by Table 2 above to detect the two instances where a device is in group M1 and not in the geographic unit tile C1 may be determined, as represented by Table 4 below:

TABLE 4

| Device | Geographic Unit tile |
|---|---|
| D1 | [{M1, C2}] |
| D2 | [{M1, C2}] |

Some embodiments may include determining a Jaccardian index of devices in the first group and devices in the first geographic unit tile based on the first value and the second value, as indicated by an operation 520. In some embodiments, the Jaccardian may be based on setting the first value to be equal to the intersection and the sum of the first value and second value to be equal to the union. For example, the Jaccardian Index for the first value v1 and the second value v2 can be determined using Equation 3 below:

$$Jacc(C1, M1) = \frac{v1}{v1 + v2} \qquad (3)$$

Device-Based Co-Visitation Geomapping

The above techniques may be complementary to a set of techniques described below by which geographic areas are characterized based on co-visitations of mobile computing devices with designated places of interest (POI). It should be emphasized, though, that these approaches may also be used independently, which is not to suggest that any other feature described is required in all embodiments.

Often it is useful to know relationships between a place of interest and areas around a place interest (e.g. other POI or un-marked locations) with respect to visitors to the place of interest. For example, a first brick-and-mortar retailer may want to know what other POI their customers visit. However, existing computer-implemented techniques are not suitable for many use cases. Often the approaches are computationally too expensive to provide relatively fine-grained analyses, resulting in a unsuitably wide zone that does not indicate specific relationships between different POI or other areas.

Some embodiments map co-visitations of mobile computing devices with a set of techniques that are expected to scale better than existing approaches to generate a zone of co-visited mobile computing devices. A zone of co-visited mobile computing devices is a spatial area where a threshold amount of a set of mobile computing devices had visited, where the set of mobile computing devices were also present at a first set of POI within a selected time period. Some embodiments may generate the zone of co-visited mobile computing devices based the first set of POI and device locations in a region, where device locations may be determined based on a dwell. A dwell for a device may include at least part of a set of information indicating a location, a time of visit to the location, or a duration of visit at the location. In some embodiments, the location may be indicated by a latitude and longitude coordinate, an identifier associated with a unit tile, an identifier associated with a place of interest, and the like. In addition, some embodiments may obtain the first set of POI and a set of candidate POI, which may be a second set of POI that is indicated to have an associated set of dwell-based values, and further determine the set of geographic unit tiles based on the first set of POI or the set of candidate POI.

The resulting zone of co-visited mobile computing devices can be used for a variety of purposes. In some cases, the zone of co-visited mobile computing devices can be used to determine a more accurate travel path of visitors to a place of interest. This increase in accuracy may increase the efficiency of follow-up activities such as providing future walking paths. Furthermore, some embodiments may compute a heat-map like representation of a region by scoring tiles based on co-visitation rates with designated POI, like dwells in stores in a chain. In addition, some embodiments may include operations that increases the efficiency and accuracy of zone generation by being based on widely available device dwell data instead of being based on specialized Wi-Fi login information stored in proprietary databases, which is often siloed in a private system and includes fewer devices in general. In some embodiments, each dwell from a mobile computing device for a place of interest or unit tile included in the dwell data may be generated after a duration of visit to the place of interest or unit tile satisfies a dwell creation threshold. The determination that a respective duration of visit satisfies a dwell creation threshold may be performed by an operating system being executed on the mobile computing device.

Figure 6:
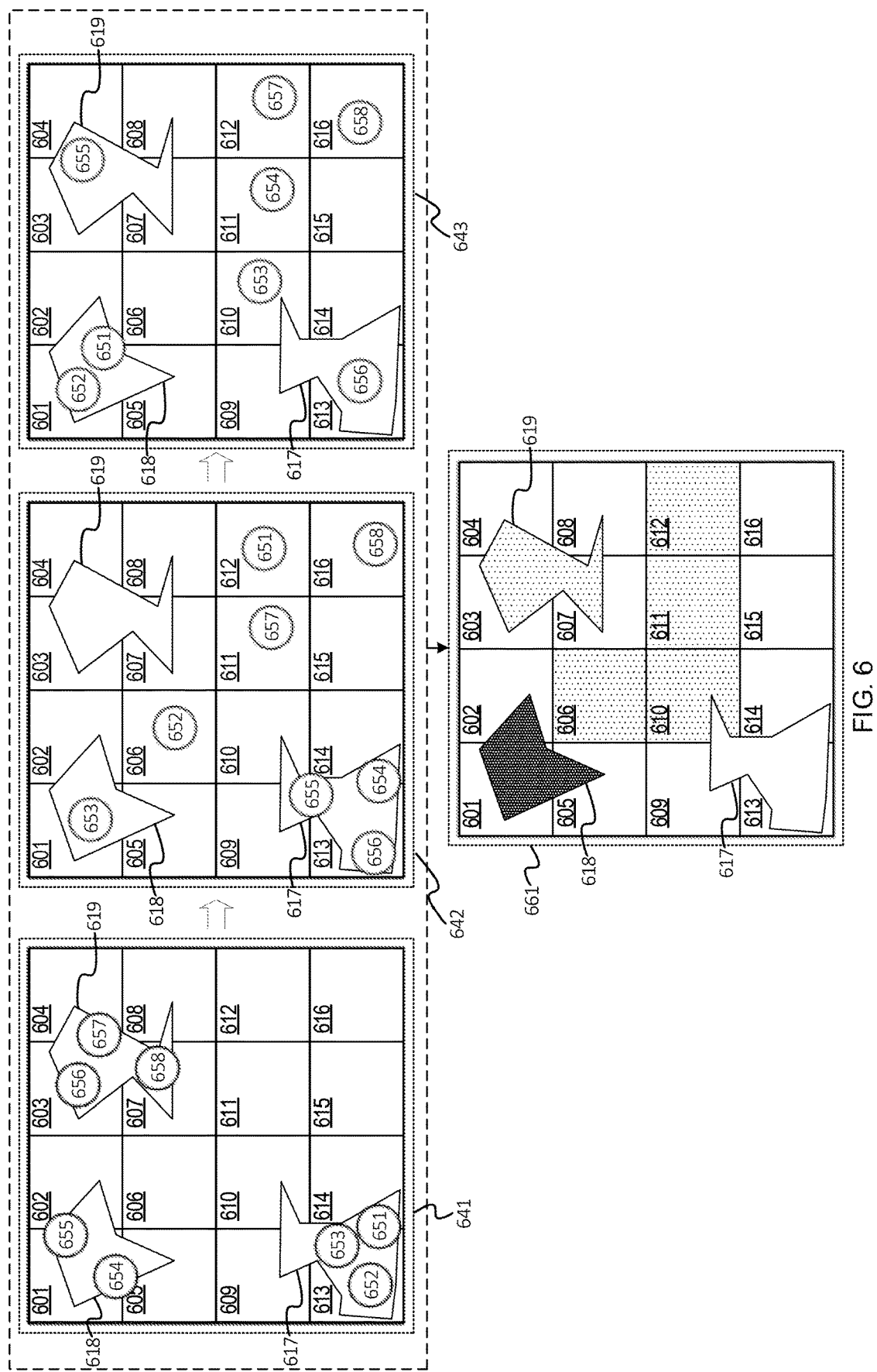
FIG. 6 is a schematic diagram of a geographic region representation at different times and a region map including a zone of co-visited mobile computing devices, in accordance with some embodiments.

FIG. 6 is a schematic diagram of a geographic region representation at different times and a region map including a zone of co-visited mobile computing devices, in accordance with some embodiments. As shown in FIG. 6, the positions of the mobile computing devices may be determined based on the wireless signals transmitted or received by those mobile computing devices. These wireless signals and geographic data may be obtained with the techniques described above. For example, the data may be recorded and stored as mobile computing devices' data on a local environment, a cloud computing environment, or a distributed computing environment. For example, the device locations shown in FIG. 6 may be determined based on wireless signal data stored in the set of data stores 134, and the computer system 102 may build a geographic region representation of a region in which these wireless signals were stored.

The computer system 102 may generate (e.g., form or update) zones (e.g., contiguous or non-contiguous geographic areas) of co-visited devices based on wireless signals from mobile computing devices 651-658 associated with the geographic region representation 610. While only eight mobile computing devices are shown in FIG. 6, some embodiments may receive more than 100 million or more than 1 billion time-stamped geolocations spanning an area larger than 100 square miles from more than 10 or 100 million different mobile devices. For example, some embodiments may receive over 100 billion time-stamped geolocations over a one month period from 100 million mobile devices across the United States. Each of the dashed boxes 641-643 represent a depiction of the geolocations of mobile computing devices 651-658 in the geographic region representation 610, where each of the geolocations may be determined based on wireless signals transmitted by the mobile computing devices 651-658. Furthermore, as shown in FIG. 6, the first dashed box 641 represent the device locations at a first time, the second dashed box 642 represents the device locations at a second time, the third dashed box 643 represent the device locations at a third time. The geographic region representation 610 is partitioned into a first set of geographic unit tiles 601-616. While the geographic region representation 610 is partitioned into less than 20 geographic unit tiles in FIG. 6, some embodiments may separate a geographic region into more than 20, more than 1000, or more than one 1 million geographic unit tiles, where each of the geographic unit tiles may the same bounding polygon or have a different bounding polygon.

The geographic region representation 610 also includes a first place of interest 617, first candidate place of interest 618, and second candidate place of interest 619. The boundaries of a subset of the geographic unit tiles can be determined based on the borders of POI. While the geographic region representation 610 includes three POI in FIG. 6, some embodiments may have more than three POI, more than ten POI, more than 1000 POI, or more than more than 1 million POI, where each of the POI may have a same or different bounding polygon with respect to each other. In a given analysis, some embodiments may include more than 10 POI's, like chain store locations, in a region subject to analysis. A place of interest may include a set of boundaries forming an enclosed area or volume, where locations within the set of boundaries are within the place of interest and locations outside the set boundaries are outside the place of interest. Boundaries of POI's may be defined with a variety of techniques, including as a set of tiles or as bounding polygons with vertices denoted by latitude and longitude coordinates. As discussed below, a set of one or more of the geographic unit tiles may be formed such that the shape of a geographic unit tile matches the shape of the boundaries of a place of interest.

In some embodiments, each of the first place of interest 617, first candidate place of interest 618, and second candidate place of interest 619 may be represented by their own bounding polygons of respective sets of unit tiles. In some embodiments, a place of interest or candidate place of interest may be represented by a set of geographic unit tiles that are generated independently of the shape of a place of interest. For example, if the set of geographic unit tiles 601-603 are square grids and completely encompass the first candidate place of interest 618, the set of the geographic unit tiles 601-603 may form a set of unit tiles for which a single dwell-based value is calculated, where the single dwell-based value is associated with the first candidate place of interest 618. A place of interest can include a pre-determined place of interest or selected place of interest used to determine which subset of mobile computing devices to track, where the set of POI-visited mobile computing devices that visited a candidate place of interest may be used to determine dwell-based values for a set of geographic unit tiles and any associated candidate POI. As further described below, a candidate place of interest may be manually selected by a user, selected based on one or more labels associated with the candidate place of interest, and the like.

The geographic region representation can be used to represent the position of mobile computing devices. As shown in FIG. 6, over the three times represented by the dashed boxes 641-643, the first place of interest 617 is visited by the mobile computing devices 651-656. Based on this data, the set of POI-visited mobile computing devices can include the mobile computing devices 651-656. Furthermore, the first candidate place of interest 618 is visited by the mobile computing devices 651-655 over the same three times. In addition, the second candidate place of interest 619 is visited by the mobile computing devices 654-655 and 656-658 over the same three times.

In some embodiments, one or more of the geographic unit tiles in a region may have one or more associated dwell-based values. A dwell-based value associated with (e.g., specific to) a geographic unit tile may be based on an amount of mobile computing devices in the geographic unit tile. Similarly, a dwell-based value associated with a particular place of interest may be based on an amount of mobile computing devices determined to have visited either a geographic unit tile having boundaries based on the particular place of interest or set of geographic unit tiles encompassing the particular place of interest. In some embodiments, the amount of mobile computing devices may be equal to or based on the count of mobile computing devices determined to have dwelled in the geographic unit tile, where a mobile computing device may be determined to have dwelled in a geographic unit tile after a determination that the mobile computing device has been present in the geographic unit tile for a threshold amount of time (or in some cases, present in the given tile and an adjacent tile or set of tiles within a threshold distance for more than the threshold amount of time). In some embodiments, wireless signals associated with different data sessions from a same mobile computing device may increase a dwell-based value. For example, a dwell-based value may be equal to the count of the distinct dwell sessions of mobile computing devices and may increase for a geographic unit tile after a same device has dwelled in the geographic unit tile for two different times. Alternatively, a dwell-based value may be based on distinct devices, where individual data sessions in a geographic unit tile do not necessarily increase a dwell-based value for the geographic unit tile if the individual data sessions share a same mobile computing device.

As shown in the dashed box 661, a dwell-based value for a geographic unit tile may be a ratio of a first value and a second value, where the first value is based on a set of POI-visited mobile computing devices determined to have also visited the geographic unit tile and the second value is based on the set of POI-visited mobile computing devices. For example, the first place of interest 617 has an associated set of POI-visited mobile computing devices that includes the mobile computing devices 651-656. If the three times represented by the dashed boxes 641-643 represent all available wireless signal data, the count of mobile computing devices in the set of POI-visited mobile computing devices is equal to six. Similarly, the set of POI-visited mobile computing devices to have visited the first candidate place of interest 618 includes the mobile computing devices 651-655. Thus, the count of the set of POI-visited mobile computing devices to have also visited the second place of interest is equal to five, resulting in a dwell-based value of 5/6 for the first candidate place of interest 618. Similarly, the set of POI-visited mobile computing devices to have visited the second candidate place of interest 619 includes the mobile computing devices 655-656. Thus, the count of the set of POI-visited mobile computing devices to have also visited the second candidate place of interest is equal to two, resulting in a dwell-based value of 2/6 for the second candidate place of interest 619. Each of these dwell-based values may then be compared to one or more dwell thresholds, wherein satisfying one or more dwell thresholds may affect a zone of co-visited mobile computing devices.

In some embodiments, overweighting from devices which report locations with significantly greater frequency relative to other devices may be avoided using a normalized score similar to a normalized term frequency-inverse document frequency (TF-IDF) score to compare similarity and generate ranks between different geographic unit tiles or POI. Some embodiments may set a dwell-based value to the normalized score. For example, for each of the set of POI-visited mobile computing devices, the amount of dwells reported by a mobile computing device for a POI or unit tile may be divided by the respective total amount of dwells reported by the mobile computing device to generate a normalized dwell count. Some embodiments may determine a normalized visit frequency (VF) for a place of interest of mobile computing devices in the set of POI-visited mobile computing devices. Some embodiments may generate a VF vector, where each vector element of the VF vector represents a visit value that is normalized by the total number of visits. For example, each element of a VF vector for the first place of interest 617 may represent a value associated with the mobile computing devices 651-656 in sequentially increasing order (e.g. [651, 652, 653, 654, 655, 656]). Each element of the VF vector may be determined by dividing the number of visits to the first place of interest 617 by the total number of reported visits in any of the POI or geographic unit tiles. As shown in FIG. 6, each of the mobile computing devices 651-655 visit the first place of interest 617 once, the mobile computing device 656 visits the first place interest 617 twice, and each of the six mobile computing devices 651-656 indicate a total of three visits. These visits can result in a VF vector equal to [1/3, 1/3, 1/3, 1/3, 1/3, 1/3, 2/3]. Similar VF vectors may calculated for each of the POI or geographic unit tiles and combined to form a VF matrix, where rows of the VF matrix represent values associated with a place of interest or geographic unit tile, and where columns of the VG matrix represent different mobile computing devices.

In addition to a VF matrix, an inverse total visit frequency (ITF) matrix for a mobile computing device may be determined based on ratios, wherein each of the ratios may be equal to the total number of POI or geographic unit tiles divided by the total number of POI or geographic unit tiles visited by one of the set of mobile computing device, or a logarithm (or other function) thereof. For example, assuming that each of the POI 617-619 are represented by their own geographic unit tile, the total number of unit tiles is 19. As shown in FIG. 6, the number of unique unit tiles visited by mobile computing devices 651-656 are, 3, 3, 3, 3, 3, and 2, respectively. Using these values, if the ITF vector is determined by taking a logarithm of the ratio described above, resulting in the ITF for device 651 may be equal to [ln(19/3), ln(19/3), ln(19/3), ln(19/3), ln(19/3), ln(19/2)], or approximately [1.85, 1.85, 1.85, 1.85, 1.85, 0.97] for each of the mobile computing devices 651-656 in monotonically increasing order, wherein the ITF vector may be turned used to form an ITF matrix, where the ITF vector is the diagonal of an ITF matrix. Some embodiments may use a product (e.g. cross product) of the VF matrix and ITF vector to determine a dwell-based values the POI and geographic unit tiles.

Various methods may be used to increase the efficiency of determining whether a set of POI-visited mobile computing devices have visited a candidate place of interest. Some embodiments may, for each of the set of POI-visited mobile computing devices, track the visits based on reported dwells and determine which candidate POI were visited, if any. Some embodiments may use this method if dwell data is indexed by device identifiers. Alternatively, some embodiments may traverse a table representing the geographic unit tiles or POI and record/indicate visits from mobile computing devices in the set of POI-visited mobile computing devices. Some embodiments may use this second method if dwell data is indexed by geographic unit tiles or POI.

Figure 7:
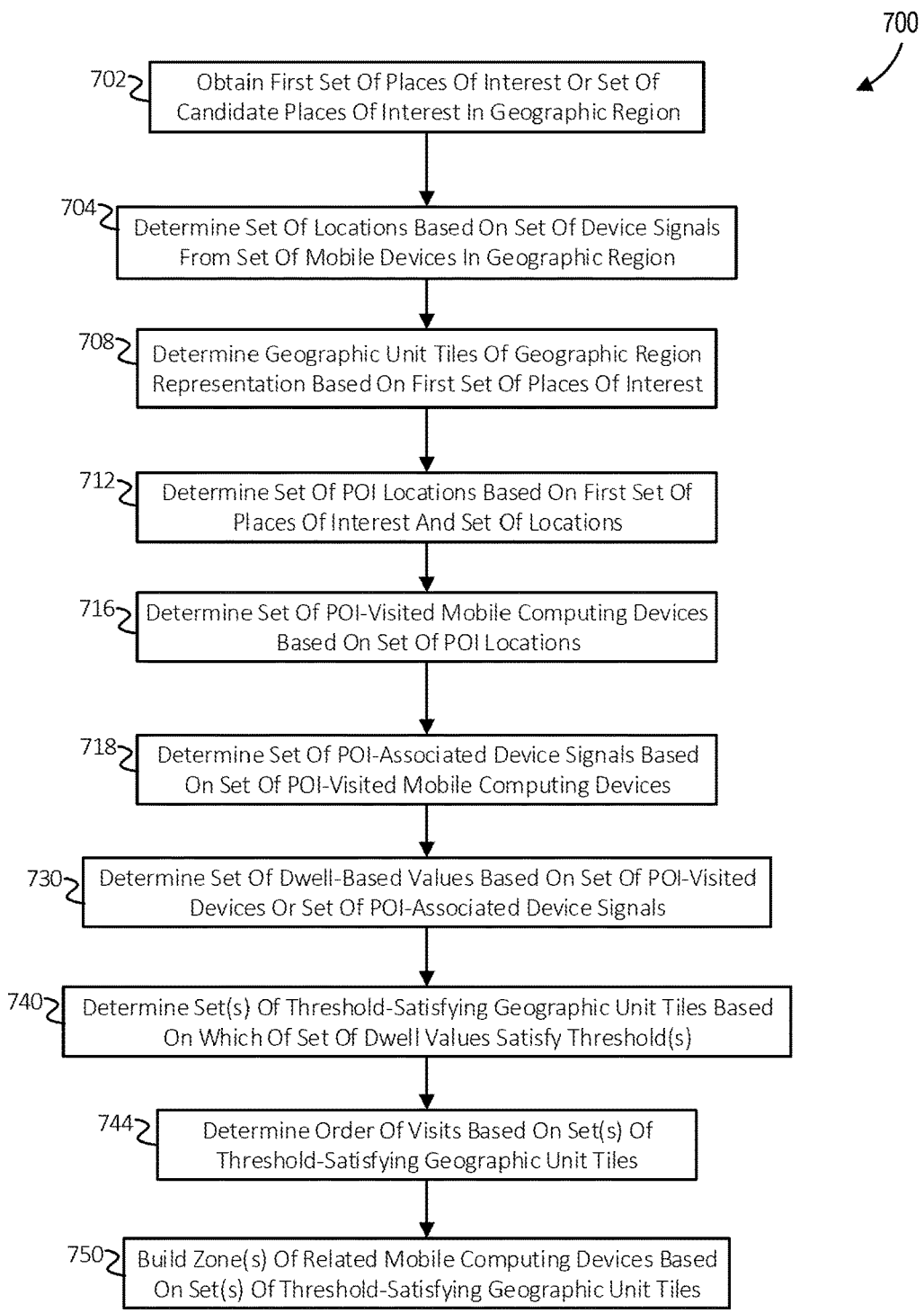
FIG. 7 is a flowchart of a process that may be implemented in the computing environments of FIG. 6 to build a zone of co-visited mobile computing devices, in accordance with some embodiments.

FIG. 7 is a flowchart of a process that may be implemented in the computing environments of FIG. 6 to build a zone of co-visited mobile computing devices, in accordance with some embodiments. In some embodiments, the process 700 includes obtaining a set of POI in a geographic region, as indicated by the operation 702. Obtaining the set of POI can include selecting a geographic place of interest from a set of available sites. For example, a user may select a set of sites from a pre-existing set of sites in a graphical user interface or from an array of different sites using a text-based input. Alternatively, or in addition, the geographic sites may have an associated set of labels which may then be used to filter for the set of geographic sites based on one or more labels. For example, a set of POI may be selected based on which of a set of sites are associated with a label "CustomerLabel1" in a geographic region.

In some embodiments, the process 700 may also include obtaining a set of candidate POI, like bounding polygons of stores in a chain. The set of candidate POI may be pre-selected sites as potential gathering places for visitors. In some embodiments, the set of candidate POI may be associated with one or more labels. For example, a first subset of the set of candidate POI may be associated with the same label as the label(s) associated with a one or more POI (e.g. "CustomerLabel1") and a second subset of the set of candidate POI may be associated with labels that are different from those of the set of POI. The set of candidate POI may be obtained by manual selection. Alternatively, or in addition, the set of candidate POI may be selected based on one or more labels associated with the set of candidate POI. For example, after entering "CustomerLabel1" into a search box, some embodiments may obtain a set of candidate POI and a set of POI each associated with the label "CustomerLabel1."

In some embodiments, the labels may be generated or otherwise updated based on internet activity data determined from wireless data sessions associated with the set of POI-visited mobile computing devices. A first set of labels may be generated based on the internet activity data occurring on a mobile computing device, where labels can have various values such as "Searched For Amazon" or "Searched For Restaurant." For example, a user of a mobile computing device may be visiting a place of interest and uses the on-location Wi-Fi to access internet and search for the label "CompetitorName1." This search may be recorded by a computing device in connection with the on-location Wi-Fi and may associate the device with the label "RestaurantName1." As further discussed below, the mobile computing device may then be brought to a candidate place of interest already associated with the same label "RestaurantName1," where this relationship between device activity and physical visit can be indicated.

In some embodiments, the process 700 includes determining a set of geolocations based on and wireless signals transmitted by a set of mobile computing devices in the geographic region, as indicated by operation 704. In some embodiments, the set of geolocations may be directly obtained from the set of wireless signals. For example, metadata associated with each of a set of wireless signals may be used to determine the geolocations of the devices transmitting each of the set of wireless signals. Alternatively, in cases where location data directly associated with a mobile computing device is not available, a geolocation of one or more wireless signals may be set to the geolocation of a cell tower in communication with the mobile computing device. In some embodiments, the geolocation data may have three dimensions. For example, the geolocation data may provide latitudes, longitudes, and an absolute or relative metric of height. Unless otherwise stated, the methods described below are equally applicable to a three-dimensional shape and the zone of co-visited mobile computing devices may be a three-dimensional shape. As discussed further below, three-dimensional geolocation data may increase the effectiveness of the methods described below in a vertical environment, such as during drone delivery. In some cases, an OS of mobile computing devices may be queried for OS-classified dwells by a native application, and a set of time-stamped dwell geolocations may be reported by the native application to a remote server from which geolocations are obtained.

In some embodiments, the set of wireless signals can be obtained from a set of signal receivers distributed across a geographic location. For example, the signal receivers 114 can collect wireless signals from the mobile computing devices 116. Alternatively, the wireless signals may be obtained as data entries from a data table or other data structure, where the data entries include a location or approximate location of the mobile computing device. The data entries may also include other values such as a mobile computing device identifier, a data session identifier, a time associated with wireless signal such as the time wireless signal was sent, and the like. In some embodiments, a portion of the data collected may be anonymized, have values removed, or otherwise modified to preserve the privacy of mobile computing device users. For example, each of the mobile computing device identifiers may be hashed before being stored.

In addition to geolocation data, some embodiments may obtain various other information based on the wireless signals. Some embodiments may obtain signal times associated with the wireless signals, where a signal time may be associated with a wireless signal and geolocation if the wireless signal was transmitted from the geolocation at the signal time. For example, some embodiments may obtain "00:10" as the signal time associated with a first geolocation and a first wireless signal, where the first wireless signal was sent at the location of the first geolocation at the signal time "00:10."

Some embodiments may filter or otherwise limit analysis of wireless signals based on their associated signal times. For example, some embodiments may apply a time proximity filter to analyze only wireless signal data corresponding to wireless signals transmitted within a travel time interval of a visit to a place of interest. The set of geolocations associated with these filtered wireless signals may be described as a temporally-proximate set of geolocations. For example, a wireless signal is transmitted from a mobile computing device at a first geolocation that is within a place of interest at the moment indicated by a first signal time, where the mobile computing device is leaving the place of interest at that moment. In this example, if there are no other POI, and if the travel time interval is three hours, only wireless signals sent out within three hours of the first signal time will be analyzed, and thus only geolocations traveled by the mobile computing device within the three hour period after the first travel time will be analyzed.

In addition, or alternatively, some embodiments may also apply a specified time filter that discards device or signal data not associated with a specific time of day or a specific time range. For example, some embodiments may apply the specified time filter to allow only the wireless signals transmitted between 8 AM and 5 PM for analysis. Other time ranges, such as 6 PM and 2 AM or 4 PM to 5 AM, are possible. Some embodiments may also apply a dwell duration filter that discards device or signal data of mobile computing devices in a candidate place of interest or geographic unit tile if the associated device is determined to have not visited the candidate place of interest or geographic unit tile, respectively, for longer than a dwell duration threshold. For example, a count of mobile computing devices that have visited a candidate place of interest can be equal to ten, and this count of mobile computing devices can be reduced to six based on a determination that only six of the ten mobile computing devices stayed in the candidate place of interest for longer than a dwell duration threshold of five minutes. In some embodiments, applying a dwell duration threshold to the set of mobile computing devices can be useful to filter out visits to sites or geographic unit tiles not indicative of an actual stay at the place of interest or geographic unit tile.

Some embodiments may provide data regarding a sequence of visits ("visitation sequence"). For example, some embodiments may track the positions of mobile computing devices that visit a first geographic unit tile, a second geographic unit tile, and a third geographic unit tile, in that sequence and calculate the likelihood of visiting each of the geographic unit tiles in that sequence. In some embodiments, the visitation sequence may include the sequence of visits and a set of metrics that include likelihood values associated with a visit to each of the set of geographic unit tiles based on past visits. In some embodiments, each of the sequence of visits can include POI and candidate POI, described further below. For example, a determination can be made that 30% of mobile computing devices which appeared at a first place of interest will be present at a second place of interest within a one-hour interval (or other temporal proximity threshold) before visiting any other sites.

In some embodiments, the process 700 includes determining the set of geographic unit tiles of a geographic region based on the first set of POI, as indicated by operation 708. Some embodiments may determine a set of geographic unit tiles based on the set of POI without a set of candidate POI. Alternatively, the geographic region may be partitioned into a set of geographic unit tiles based on the set of candidate POI without the set of POI. Alternatively, or in addition, the set of geographic unit tiles may be based on both the set of POI and the set of candidate POI. For example, the geographic unit tiles may be determined such that each area enclosed by the boundaries of the set of candidate POI and the first set of POI are formed into their own respective geographic unit tiles. Alternatively, some embodiments may determine the set of geographic unit tiles independently of the first set of POI. As an additional alternative, some embodiments may include determining the geographic unit tiles of a geographic region using an operation similar to the operation 402 of process 400.

In some embodiments, the process 700 includes determining a set of POI locations based on the set of geolocations and the set of POI, as indicated by operation 712. The set of POI locations is a subset of the set of locations. Each of the set of POI locations may be in the set of geolocations described above, wherein each of the set of POI locations is in or at the boundary of one of set of POI. As described above, a determination may be made that a geolocation is within a geographic unit tile or other shape having a set of boundaries using various point-in-polygon methods. As described above, some embodiments may use a ray casting algorithm or a winding number algorithm to determine whether a geolocation is within a place of interest. For example, some embodiments may track which quadrants the shape of the geographic unit tile winds as it turns around the geolocation to determine the geolocation's winding number with respect to the geographic unit tile, where a non-zero winding number indicates that the geolocation is inside of the geographic unit tile. Thus, if the winding number of a geolocation with respect to a geographic unit tile is non-zero, the geolocation is a part of the set of POI locations. Or to expedite operations, some embodiments may index square unit tiles to polygons of POI, name the unit tiles by appending a latitude and longitude with a threshold number of significant digits, and determine whether reported geolocations are within the POI by truncating less-significant digits of the reported geolocations and determining whether the truncated values correspond to the name of a tile in the set of tiles indexed to a POI, thereby avoiding more computationally expensive point-in-polygon determinations.

In some embodiments, the process 700 includes determining a set of POI-visited mobile computing devices based on the set of POI locations, as indicated by operation 716. The set of POI-visited mobile computing devices can be a subset of the set of mobile computing devices described above in the operation 704. In some embodiments, each of the set of POI-visited mobile computing devices may be devices that are explicitly indicated to have visited the set of POI. Alternatively, or in addition, some embodiments may determine the set of POI-visited mobile computing devices by determining which mobile computing devices transmitted one or more wireless signals from the set of origin-visited wireless signals. For example, some embodiments may analyze a set of wireless signals to detect which wireless signals are associated with one of the set of POI locations. For each respective wireless signal determined to be associated with one of the set of POI locations, the respective mobile computing device that transmitted the respective wireless signal may be added to the set of POI-visited mobile computing devices.

In some embodiments, the process 700 includes determining a set of POI-associated wireless signals that are associated with the set of POI-visited mobile computing devices, as indicated by operation 718. Determining the set of POI-associated wireless signals may include filtering the full set of wireless signals to only the wireless signals associated with the set of POI-visited mobile computing devices. For example, if a first wireless signal and a second wireless signal are part of the full set wireless signals, but only the first wireless signal is associated one of the set of POI-visited mobile computing devices, then the set of POI-associated wireless signals may include the first wireless signal and not the second wireless signal. Alternatively, determining the set of POI-associated wireless signals may include acquiring wireless signal data from an external source and determining what data from the acquired wireless signal data may is associated with a POI. For example, some embodiments may acquire batch data from an external drive or a remote server via an API, wherein wireless signal data in the batch data may include device identifiers (or their hashes) mapped to billions of time-stamped geolocations of the corresponding devices associated with the device identifiers over a month-long interval. Some embodiments may then filter the wireless signal data to determine which of the time-stamped geolocations or associated values (e.g. time, locations, device identifiers) to include in the set of POI-associated wireless signals.

In some embodiments, the process 700 includes determining a set of dwell-based values based on the set of POI-visited mobile computing devices or the set of POI-associated wireless signals, as indicated by operation 730. A dwell-based value may include various metrics based on the dwells of set of POI-visited mobile computing devices. In some embodiments, a dwell-based value may be associated with the dwells of mobile computing devices that have visited the geographic unit tile, or the wireless signals transmitted from the geographic unit tile. As used in this disclosure, a dwell-based value may be associated with a place of interest (e.g. candidate place of interest or place of interest from the first set of POI) if the dwell-based value is associated with a geographic unit tile that shares at least a portion of a boundary with the place of interest, overlaps at least a portion of the place of interest, and has an area that is within 10% of the area of the place of interest. For example, a first dwell-based value can be associated with a first candidate place of interest if the first dwell-based value is associated with a geographic unit tile that tracks 95% of the boundaries of the first candidate place of interest and is 8% larger than the first candidate place of interest. Some embodiments may determine a dwell-based value for a first geographic unit tile based on a ratio of the count of mobile computing devices to have visited both a first geographic unit tile and a place of interest to a count of the set of POI-visited mobile computing devices. For example, if the count of a set of POI-visited mobile computing devices is equal to 100, and the count of the mobile computing devices that have visited both the set of POI and visited a candidate place of interest is equal to 51, then the dwell-based value associated with the candidate place of interest can be equal to 0.51.

Some embodiments may determine a dwell-based value for a first geographic unit tile based on distinct visits without discounting repeated visits. As a set of example events, a same mobile computing device may visit a first geographic unit tile for a first visit, leave the first geographic unit tile, and return to the geographic unit tile for a second visit. Some embodiments may record each visit as a distinct visit without discarding the visits, increasing the count of distinct visits by two in the case of the set of example events. Alternatively, or in addition, some embodiments may assign an visit weight some or all of the visits, where the visit weight may reduces the magnitude of change to a dwell-based value based on the time difference between the time a dwell was reported and the target time of analysis. The target time may be a pre-determined time or whenever the analysis is being performed. For example, some embodiments may assign a visit weight having a half-life of five days to each visit with respect to its contribution a dwell-based value being determined for day 99. Using this example, the visit weight at day 94 and 89 may be 0.5 and 0.25, respectively, and the total contribution to the dwell-based value from day 94 and day 89 may be an increase equal to 0.75. Alternatively, some embodiments may require that dwell-based values for a first geographic unit tile are based on distinct visits while discounting repeated visits. Using the same set of example events above, some embodiments may discard or otherwise not record the second visit, increasing the count of distinct visits by only one in the case of the set of example events, which may be equivalent to setting a visit weight to zero in some embodiments for all repeat visits.

In some embodiments, the process 700 may include determining one or more sets of threshold-satisfying geographic unit tiles based on which of the associated set dwell-based values satisfies one or more thresholds, as indicated by operation 740. Some embodiments may determine a set of threshold-satisfying geographic unit tiles based on a comparison between each of the set of dwell-based values and a dwell threshold, where satisfying the dwell threshold with a dwell-based value results in a determination that its associated geographic unit tile is a threshold-satisfying geographic unit tile. Some embodiments may also determine a set of threshold-satisfying POI based on a comparison between each of the set of dwell-based values associated with one or more of a set of candidate POI and a dwell threshold, where satisfying the dwell threshold with a dwell-based value results in a determination that its associated candidate place of interest is a threshold-satisfying place of interest. In some embodiments, if the dwell-based value is a ratio, the dwell threshold may also be a ratio. For example, the dwell threshold may be a value between 0.0 to 1.0, such as 0.1, 0.25, 0.5, 0.75, 0.9, 0.95, 0.99, and the like. In some embodiments, a dwell threshold may be a predetermined value, where the predetermined value is predetermined before initiation of the process 700. Alternatively, or in addition, a dwell threshold can be determined during the operation of the process 700. In some embodiments, the dwell threshold may be based on the dwell-based value for a set of POI. For example, if a set of POI includes three POI, and a count of the dwells for the three values is four, seven, and ten, respectively, then some embodiments may normalize the dwell-based value of the set of POI-visited mobile computing devices by a measurement of centralized tendency of the count of dwells associated with each of the POI. While the above embodiment uses a count of dwells, some embodiments may determine a dwell-based value based on other values such as a minimum count of dwells, a maximum count of dwells, a ratio of the dwells, and the like.

In some embodiments, multiple dwell thresholds may be used, wherein different tags, labels, or other identifiers may be associated with a threshold-satisfying geographic unit tile to indicate which of the multiple dwell thresholds were satisfied. For example, a first dwell threshold can be associated with a label of "POI dwell threshold," can be equal to 0.50, and can be satisfied only by geographic unit tiles associated with a place of interest. A second dwell threshold can be associated with a label of "zone dwell threshold" and can be equal to 0.25. After a comparison of each of the set of dwell-based values with each of the multiple dwell thresholds, the set of geographic unit tiles may be associated with the labels "co-visited POI" or "co-visited unit tile" based on satisfying the first dwell threshold and second dwell threshold, respectively. In some embodiments, a series of dwell threshold may be used to generate a series of sets of threshold-satisfying geographic unit tiles, wherein the count of geographic unit tiles in the series decrease as the dwell threshold increases. As further described below, the series of sets of threshold-satisfying geographic unit tiles may be used to generate a heat map based on the co-visited devices. In some embodiments, one or more sets of threshold-satisfying geographic unit tiles may be stored in a computer system. For example, a set of threshold-satisfying geographic unit tiles may be stored in a non-transitory machine-readable medium on a centralized server.

In some embodiments, the process 700 may include determining an order of visits based on one or more sets of threshold-satisfying geographic unit tiles, as indicated by operation 744. As described above, some embodiments include a set of signal times associated with the set of wireless signals. In some embodiments, a determination may be made if whether an example set of mobile computing devices having visited a first place of interest or geographic unit tile proceed to a second place of interest or geographic unit tile based on the times associated with the wireless signals sent from the example set of mobile computing devices, where either the first or second place of interest or geographic unit tile may be one of the set of POI or the set of threshold-satisfying sites described above. For example, based on an analysis of wireless signals sent from 100 mobile computing devices indicated to have visited one of the set of POI, a determination may be made that 30 of the 100 mobile computing devices proceeded to one of the set of threshold-satisfying geographic unit tiles based on times associated with the 100 mobile computing devices. In some embodiments, the order of visits may be used to generate a sequence-aware model of visits, where the sequence-aware model of visits includes an indication of a temporal sequence of a first place of interest or threshold-satisfying geographic unit tile and a second place of interest or threshold-satisfying geographic unit tile. For example, the sequence-aware model may include an ordered list of threshold-satisfying geographic unit tiles, an indicated direction from the first place of interest to the second place of interest, and the like. In some embodiments, determining whether a mobile computing device visited a second place of interest after visiting a first place of interest may be based on whether the mobile computing device visited the second place of interest within a time proximity threshold of visiting the first place of interest.

Some embodiments may use various statistical models or neural networks to generate metrics or otherwise predict an order of visits for generating a sequence-aware model. Example models may include a hidden markov model, maximum entropy markov models, input-output markov models, conditional random fields, graph transformer networks, recurrent neural network (RNN), and the like. For example, some embodiments may use a RNN such as a long short-term memory (LSTM) neural network to predict or otherwise measure an order of visits. Using one or more of these statistical models or neural networks, some embodiments may map transition probabilities between different locations in addition to or as an alternative to mapping co-visitation rates. For example, using a sequence-aware model generated by a neural network, some embodiments may reveal that a particular sequence of visits includes a transition probability of 75% from a gymnasium to an ice cream shop for a set of devices. Further description of statistical models and neural networks for determining sequential information may be described by the following paper available at "http://web.engr.oregonstate.edu/~tgd/publications/mlsd-ssspr.pdf" and incorporated herein by reference: Dietterich, Thomas G. (2002), "Machine Learning for Sequential Data: A Review."

While the above describes the process 700 as including operations to determine an order of visits, some embodiments may include operations of the process 700 without determining an order of visits. For example, some embodiments may process visits over a month-long period to determine a dwell-based value for each associated POI or geographic unit tiles without recording any sequence or other temporal relationship between visit or visit. Thus, some embodiments may proceed to determine zones of co-visited mobile devices as described further below in the operation 750 without determining an order of visits.

In some embodiments, the process 700 may include building a zone of co-visited mobile computing devices based on one or more sets of threshold-satisfying geographic unit tiles, as indicated by operation 750. In some embodiments, building the zone of co-visited mobile computing devices may include indicating which of the set threshold-satisfying geographic unit tiles are to be displayed on a place of interest or threshold-satisfying place of interest. For example, a zone of co-visited mobile computing devices may be built by using labels associated with the set of threshold-satisfying geographic unit tiles to indicate which geographic unit tiles to highlight or visually indicate on a region map. In some embodiments, one or more of the labels associated with POI or geographic unit tiles may be displayed or otherwise indicated on a region map. In some embodiments, the zone of co-visited mobile computing devices may be represented on a region map as the area encompassing the set of threshold-satisfying geographic unit tiles.

Some embodiments may include various other indicators to represent specific behaviors or features. As discussed above, some embodiments may include operations to determine whether a shared label exists between a candidate place of interest and an activity-generated association. In response to a determination that a shared label exists between a label associated with a device and the label associated with a candidate place of interest, the candidate place of interest may be indicated on the region map. Also as discussed above, some embodiments include operations to determine a sequence of geographic unit tiles through which mobile computing devices moves. In some embodiments, this sequence may be represented using arrows in a visual figure or vectors or pointers in a data structure.

As discussed above, some embodiments may include a plurality of sets of threshold-satisfying geographic unit tiles. Some embodiments can generate a set of overlapping zones of co-visited devices based on the plurality of sets of threshold-satisfying geographic unit tiles. In some embodiments, the overlapping zones of co-visited device may indicate the greatest dwell threshold satisfied by a particular geographic unit tile, resulting in a heat map based on a dwell-based value.

Alternatively, or in addition, some embodiments may build the zone of co-visited mobile computing devices by building a graph of threshold-satisfying geographic unit tiles or sites, where the graph includes graph nodes and node connections. Each of the graph nodes may represent one of the set of threshold-satisfying geographic unit tiles or set of POI. For example, a first node of the graph nodes may represent a geographic unit tile tracing the boundaries of a place of interest and a second node of the graph nodes may represent a geographic unit tile tracing the boundaries of a threshold-satisfying geographic unit tiles. In addition, at least one node connection may connect a node representing one of the POI and a node representing one of the threshold-satisfying geographic unit tiles. Based on this graph, some embodiments may build a zone of co-visited mobile computing devices such that the geographic area of the zone of co-visited mobile computing devices is within one or more spatial ranges of each of the set of POI, set of threshold-satisfying geographic unit tiles, or connection between the two sets form the zone of co-visited mobile computing devices. For example, some embodiments may generate (a term used interchangeably with the term build) a zone of co-visited mobile computing devices comprising a visual representation of the graph, wherein each graph node is represented in the zone of co-visited mobile computing devices as a circle having a radius of to 50 meters, and each node connection is represented in the zone of co-visited mobile computing devices as a line having a thickness of 25 meters.

Some embodiments may build a graph of co-visited POI. For instance, some embodiments may compute an aggregate measure (e.g., mean, median, mode, sum, etc) of dwell-based values of tiles in a bounding polygon of another place of interest (like a competing store for a set of stores being analyzed). Some embodiments may threshold out those other POI's with less than a threshold aggregate measure and form a weighted graph in which nodes represent POI's and edges indicate the aggregate measures of co-visitation. Some embodiments may construct a graphical representation of the graph, like a force-directed representation, and cause that visualization to be displayed.

In some cases, nodes of a graph of co-visited POI or graph of threshold-satisfying geographic unit tiles may be ranked using a PageRank algorithm or weighted PageRank algorithm. For example, nodes associated with each of the set of POI or threshold-satisfying geographic unit tiles may be indicated using a weighted PageRank algorithm, where a node is indicated as satisfying a ranking threshold if the associated weighted PageRank value satisfies the ranking threshold. Some embodiments may add areas associated with nodes satisfying the ranking threshold to the zone of co-visited mobile computing devices. Alternatively, some embodiments may separately assign the areas associated with nodes satisfying the ranking threshold as an additional zone of importance and display or otherwise indicate the zone of importance concurrently with the zone of co-visited devices. Additional description of a method similar to this method may be found by the following paper available at "https://arxiv.org/abs/physics/0612011" and incorporated herein by reference: Jiang, Bin (2006), "Ranking Spaces for Predicting Human Movement in an Urban Environment".

In some embodiments, the zone of co-visited mobile computing devices (or a region map comprising the zone of co-visited mobile computing devices) may be queried to determine whether a bid should be made on an ad auction associated with an area on the region map or for determining what content to display based on a query result. For example, a mobile computing device may query a region map to determine that the mobile computing device is in a zone of co-visited mobile computing devices and displays a message stating "welcome to the zone of co-visited mobile computing devices" in response to the query result. Furthermore, once generated, some embodiments may store results of the process described above in a memory of the computer system, where the results may include the zone of co-visited mobile computing devices, the graph of co-visited places, a region map that includes the zone of co-visited mobile computing devices, and the like.

Figure 8:
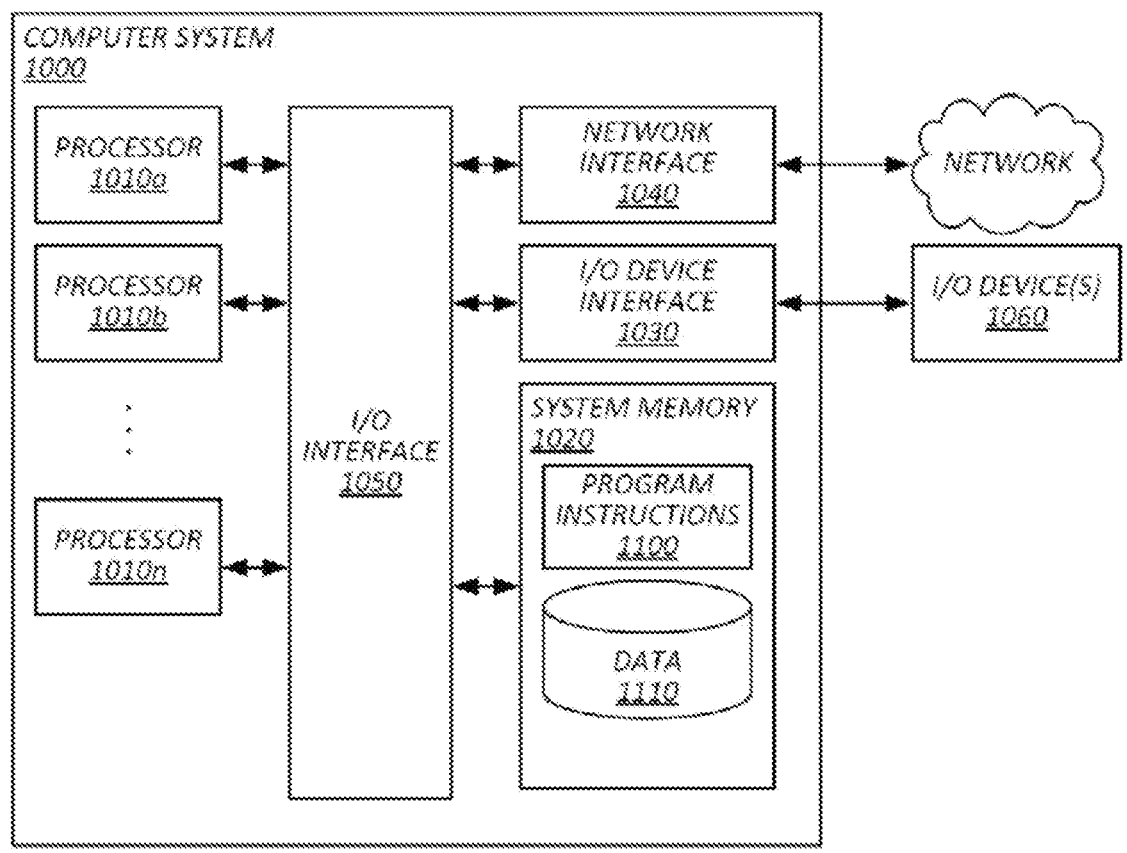
FIG. 8 shows an example of a computing device by which the present techniques may be implemented, in accordance with some embodiments.

FIG. 8 shows an exemplary computer system 1000 by which the present techniques may be implemented in accordance with some embodiments. Various portions of systems and methods described herein, may include or be executed on one or more computer systems similar to computer system 1000. Further, processes and modules described herein may be executed by one or more processing systems similar to that of computer system 1000.

Computer system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computer system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., a vision processing unit (VPU), a neuromorphic complementary metal-oxide-semiconductor (CMOS) chip, an FPGA (field programmable gate array), a PGA (programmable gate array), or an ASIC (application specific integrated circuit) such as a tensor processing unit (TPU). Computer system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of mobile computing devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, sent via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information sent over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X' ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory, machine-readable medium storing instructions that, when executed by one or more processors, effectuate operations comprising: segmenting a geographic region representation into a first set of geographic unit tiles, each geographic unit tile being a different geographic area of the geographic region representation; obtaining a set of geolocations at which mobile devices among a set of mobile devices are detected based on device signals transmitted by the mobile devices; for each geographic unit tile in the first set of geographic unit tiles, determining a respective amount of mobile devices observed within the respective geographic unit tile based on the obtained set of geolocations; for each geographic unit tile in the first set of geographic unit tiles, determining a respective weight based on the respective amount of mobile devices observed within the respective geographic unit tile to form a set of weights; assigning each tile of a subset of the first set of geographic unit tiles with a set of groups based on the set of weights, wherein assigning each tile of the subset of the first set of geographic unit tiles comprises assigning a first geographic unit tile in the first set of geographic unit tiles to a first group in the set of groups; building a first hash map based on a set of device identifiers, the first set of geographic unit tiles and the set of groups, wherein the first hash map comprises one or more key-value pairs; building a second hash map by traversing the first hash map, wherein: keys of the second hash map are based on the set of device identifiers, keys correspond to values in the second hash map, and values of the second hash map comprise paired elements; determining a first subset of devices among the set of mobile devices and a second subset of devices among the set of mobile devices by traversing the second hash map, wherein the first subset of devices is associated with the first group, and wherein the second subset of devices is associated with a second group that is also from the set of groups; determining whether a second geographic unit tile is to be assigned to the first group or the second group based on a comparison between the first subset of devices and the second subset of devices; assigning the second geographic unit tile to the first group in response to a determination that the second geographic unit tile is to be assigned to the first group; and building a region map comprising the set of groups, wherein each of the first set of geographic unit tiles indicates one of the set of groups.

2. The medium of embodiment 1, wherein segmenting the geographic region representation into a set of geographic unit tiles comprises: determining a first sub-region representation and a second sub-region representation, wherein both the first sub-region representation and the second sub-region representation are portions of the geographic region representation; determining a first set of preliminary seeded geographic unit tiles based on weights associated with geographic unit tiles in the first sub-region representation; determining a second set of preliminary seeded geographic unit tiles based on weights associated with geographic unit tiles in the second sub-region representation; determining a third sub-region representation, wherein the third sub-region representation comprises a portion of the first sub-region representation and a portion of the second sub-region representation.

3. The medium of any of embodiments 1 to 2, further comprising: determining whether the set of groups satisfy a set of remapping criteria; and in response to the set of groups satisfying at least one of the set of remapping criteria, re-assigning the first set of geographic unit tiles based on the set of weights.

4. The medium of embodiment 3, wherein determining whether the set of groups satisfy the set of remapping criteria comprises determining whether a third geographic unit tile assigned to a third group and a fourth geographic unit tile assigned to a fourth group border each other, wherein the third geographic unit tile and the fourth geographic unit tile are both within a same city boundary.

5. The medium of any of embodiments 3 to 4, wherein each of the paired elements comprise a geographic unit tile identifier and a group identifier.

6. The medium of any of embodiments 3 to 5, wherein determining the set of weights further comprises determining a first weight of the set to weights based on a count of devices observed in the first geographic unit tile.

7. The medium of any of embodiments 1 to 6, the operations further comprising filtering, for the respective geographic unit tile, device signals from the respective amount of mobile devices based on a duration of visit to determine a filtered set of device signals, wherein each of the filtered set of device signals in a geographic unit tile has remained in that geographic unit tile for at least a duration threshold.

8. The medium of any of embodiments 1 to 7, the operations further comprising generating a connection between a first portion of the geographic region representation and a second portion of the geographic region representation, wherein the first portion of the geographic region representation and the second portion of the geographic region representation are not connected prior to generating the connection.

9. The medium of embodiment 8, further comprising applying an image recognition method to an image of the geographic region representation to determine whether a bridge exists between the first portion of the geographic region representation and the second portion of the geographic region representation, wherein the connection is generated in response to a determination that a bridge exists between the first portion of the geographic region representation and the second portion of the geographic region representation.

10. The medium of any of embodiments 8 to 9, wherein the first group comprises a plurality of non-contiguous portions of the geographic region representation.

11. The medium of any of embodiments 1 to 10, further comprising: obtaining a preliminary geographic region representation; determining a removal portion, wherein the removal portion is in the preliminary geographic region representation; and obtaining the geographic region representation, wherein the geographic region representation comprises the preliminary geographic region representation without the removal portion.

12. The medium of any of embodiments 1 to 11, wherein determining the first subset of devices comprises determining a count of devices in the first group that is not present in the second geographic unit tile.

13. The medium of any of embodiments 1 to 12, the operations further comprising: segmenting a portion of the geographic region representation covered by the first group into a second set of geographic unit tiles; determining a second set of weights corresponding to the second set of geographic unit tiles; seeding the second set of geographic unit tiles based on the second set of weights, wherein seeding the second set of geographic unit tiles comprises assigning a third geographic unit tile in the set of geographic unit tiles with a first sub-group from a set of sub-groups, wherein the third geographic unit tile is inside of the first group, wherein the region map comprises the set of sub-groups.

14. The medium of any of embodiments 1 to 13, the operations further comprising filtering the set of device signals based on a set of target locations to determine a filtered set of device signals, wherein each of the set of device signals is detected at one of the set of target locations.

15. The medium of any of embodiments 1 to 14, the operations further comprising: determining whether the first geographic unit tile is surrounded by geographic unit tiles assigned to the second group; and assign the first geographic unit tile to the second group in response to a determination that the first geographic unit tile is surrounded by geographic unit tiles assigned to the second group.

16. The medium of any of embodiments 1 to 15, the operations further comprising: determining a distinctiveness value of the first group, wherein: the distinctiveness value is correlated with a ratio of a first value and a second value; the first value is based on a first subset of device signals sent by the first subset of devices; each of the first subset of device signals were sent from a respective mobile device in the first subset of devices while the respective mobile device was within a geographic unit tile assigned to the first group; and the second value is based on a second subset of device signals sent by the first subset of devices.

17. The medium of any of embodiments 1 to 16, the operations further comprising: obtaining an input location; determining that the input location is in a geographic unit tile associated with the first group; and determining a visit rate based on a count of device signals associated with the first group.

18. The medium of any of embodiments 1 to 17, the operations further comprising: determining whether the first geographic unit tile was assigned to the first group as part of a seeding operation; and preventing the first geographic unit tile from being re-assigned to a different group in response to a determination that the first geographic unit tile was assigned to the first group as part of the seeding operation.

19. The medium of any of embodiments 1 to 18, wherein determining the set of weights further comprises: obtaining at least one of a selected frequency range; and determining the set of weights based on a count of device signals operating at the selected frequency range.

20. A method comprising: segmenting a geographic region representation into a first set of geographic unit tiles, each geographic unit tile being a different geographic area of the geographic region representation; obtaining a set of geolocations at which mobile devices among a set of mobile devices are detected based on device signals transmitted by the mobile devices; for each geographic unit tile in the first set of geographic unit tiles, determining a respective amount of mobile devices observed within the respective geographic unit tile based on the obtained set of geolocations; for each geographic unit tile in the first set of geographic unit tiles, determining a respective weight based on the respective amount of mobile devices observed within the respective geographic unit tile to form a set of weights; assigning each tile of a subset of the first set of geographic unit tiles with a set of groups based on the set of weights, wherein assigning each tile of the subset of the first set of geographic unit tiles comprises assigning a first geographic unit tile in the first set of geographic unit tiles to a first group in the set of groups; building a first hash map based on a set of device identifiers, the first set of geographic unit tiles and the set of groups, wherein the first hash map comprises one or more key-value pairs; building a second hash map by traversing the first hash map, wherein: keys of the second hash map are based on the set of device identifiers, keys correspond to values in the second hash map, values of the second hash map comprise paired elements, and each of the paired elements comprise a geographic unit tile identifier and a group identifier; determining a first subset of devices among the set of mobile devices and a second subset of devices among the set of mobile devices by traversing the second hash map, wherein the first subset of devices is associated with the first group, and wherein the second subset of devices is associated with a second group that is also from the set of groups; determining whether a second geographic unit tile is to be assigned to the first group or the second group based on a comparison between the first subset of devices and the second subset of devices; assigning the second geographic unit tile to the first group in response to a determination that the second geographic unit tile is to be assigned to the first group; and building a region map comprising the set of groups, wherein each of the first set of geographic unit tiles indicates one of the set of groups.

What is claimed is:

1. A non-transitory, machine-readable medium storing instructions that, when executed by one or more processors, effectuate operations comprising:
   segmenting a geographic region representation into a first set of geographic unit tiles, each geographic unit tile being a different geographic area of the geographic region representation;
   obtaining a set of geolocations at which mobile devices among a set of mobile devices are detected based on device signals transmitted by the mobile devices;
   for each geographic unit tile in the first set of geographic unit tiles, determining a respective amount of mobile devices observed within the respective geographic unit tile based on the obtained set of geolocations;
   for each geographic unit tile in the first set of geographic unit tiles, determining a respective weight corresponding to a demographic metric based on the respective amount of mobile devices observed within the respective geographic unit tile to form a set of weights;
   assigning each tile of a subset of the first set of geographic unit tiles with a set of groups based on the set of weights, wherein assigning each tile of the subset of the first set of geographic unit tiles comprises assigning a first geographic unit tile in the first set of geographic unit tiles to a first group in the set of groups;
   building a first hash map based on a set of device identifiers, the first set of geographic unit tiles and the set of groups, wherein the first hash map comprises one or more key-value pairs;
   building a second hash map by traversing the first hash map, wherein:
      keys of the second hash map are based on the set of device identifiers,
      keys correspond to values in the second hash map, and values of the second hash map comprise paired elements;
   determining a first subset of devices among the set of mobile devices and a second subset of devices among the set of mobile devices by traversing the second hash map, wherein the first subset of devices is associated with the first group, and wherein the second subset of devices is associated with a second group that is also from the set of groups;
   computing measures of mutual information between the second geographic unit tile and the first subset of devices and between the second geographic unit tile and the second subset of devices, wherein computing the measures of mutual information comprises:
      storing matrices representing the first subset of devices, the second subset of devices, and the second geographic unit tile in a system memory of the machine-readable medium;
      applying a blocking algorithm in which the matrices are segmented into blocks each having contiguous positions of values within a respective one of the matrices;
      iteratively loading the blocks into a higher level of memory hierarchy of the machine-readable medium from the system memory; and
      applying matrix multiplication operations to the blocks in the higher level of the memory hierarchy to determine values of resultant matrices;
      wherein the measures of mutual information are derived from the resultant matrices;
   determining whether a second geographic unit tile is to be assigned to the first group or the second group based on a comparison between the measures of mutual information between the second geographic unit tile and the first subset of devices and between the second geographic unit tile and the second subset of devices, wherein the second geographic unit tile is assigned to the one of the first group or the second group having a greater measure of mutual information;
   assigning the second geographic unit tile to the first group in response to a determination that the second geographic unit tile is to be assigned to the first group; and
   building a region map comprising the set of groups, wherein each of the first set of geographic unit tiles represents one of the set of groups corresponding to the demographic metric, and wherein at least one of the geographic unit tiles in the first set is visually displayed on the region map; and
   directing services for the first group to a geographic area represented on the region map by the subset of the first set of geographic unit tiles assigned to the first group.

2. The medium of claim 1, wherein segmenting the geographic region representation into a set of geographic unit tiles comprises:
   determining a first sub-region representation and a second sub-region representation, wherein both the first sub-region representation and the second sub-region representation are portions of the geographic region representation;
   determining a first set of preliminary seeded geographic unit tiles based on weights associated with geographic unit tiles in the first sub-region representation;
   determining a second set of preliminary seeded geographic unit tiles based on weights associated with geographic unit tiles in the second sub-region representation;
   determining a third sub-region representation, wherein the third sub-region representation comprises a portion of the first sub-region representation and a portion of the second sub-region representation.

3. The medium of claim 1, further comprising:
   determining whether the set of groups satisfy a set of remapping criteria; and
   in response to the set of groups satisfying at least one of the set of remapping criteria, reassigning the first set of geographic unit tiles based on the set of weights.

4. The medium of claim 3, wherein determining whether the set of groups satisfy the set of remapping criteria comprises determining whether a third geographic unit tile assigned to a third group and a fourth geographic unit tile assigned to a fourth group border each other, wherein the third geographic unit tile and the fourth geographic unit tile are both within a same city boundary.

5. The medium of claim 3, wherein each of the paired elements comprise a geographic unit tile identifier and a group identifier.

6. The medium of claim 3, wherein determining the set of weights further comprises determining a first weight of the set to weights based on a count of devices observed in the first geographic unit tile.

7. The medium of claim 1, the operations further comprising filtering, for the respective geographic unit tile, device signals from the respective amount of mobile devices based on a duration of visit to determine a filtered set of device signals, wherein each of the filtered set of device signals in a geographic unit tile has remained in that geographic unit tile for at least a duration threshold.

8. The medium of claim 1, the operations further comprising generating a connection between a first portion of the geographic region representation and a second portion of the geographic region representation, wherein the first portion of the geographic region representation and the second portion of the geographic region representation are not connected prior to generating the connection.

9. The medium of claim 8, further comprising applying an image recognition method to an image of the geographic region representation to determine whether a bridge exists between the first portion of the geographic region representation and the second portion of the geographic region representation, wherein the connection is generated in response to a determination that a bridge exists between the first portion of the geographic region representation and the second portion of the geographic region representation.

10. The medium of claim 8, wherein the first group comprises a plurality of non-contiguous portions of the geographic region representation.

11. The medium of claim 1, further comprising:
   obtaining a preliminary geographic region representation;
   determining a removal portion, wherein the removal portion is in the preliminary geographic region representation; and
   obtaining the geographic region representation, wherein the geographic region representation comprises the preliminary geographic region representation without the removal portion.

12. The medium of claim 1, wherein determining the first subset of devices comprises determining a count of devices in the first group that is not present in the second geographic unit tile.

13. The medium of claim 1, the operations further comprising:
   segmenting a portion of the geographic region representation covered by the first group into a second set of geographic unit tiles;
   determining a second set of weights corresponding to the second set of geographic unit tiles;
   seeding the second set of geographic unit tiles based on the second set of weights, wherein seeding the second set of geographic unit tiles comprises assigning a third geographic unit tile in the set of geographic unit tiles with a first sub-group from a set of sub-groups, wherein the third geographic unit tile is inside of the first group, wherein the region map comprises the set of sub-groups.

14. The medium of claim 1, the operations further comprising filtering the set of device signals based on a set of target locations to determine a filtered set of device signals, wherein each of the set of device signals is detected at one of the set of target locations.

15. The medium of claim 1, the operations further comprising:
   determining whether the first geographic unit tile is surrounded by geographic unit tiles assigned to the second group; and
   assigning the first geographic unit tile to the second group in response to a determination that the first geographic unit tile is surrounded by geographic unit tiles assigned to the second group.

16. The medium of claim 1, the operations further comprising:
   determining a distinctiveness value of the first group, wherein:
      the distinctiveness value is correlated with a ratio of a first value and a second value;
      the first value is based on a first subset of device signals sent by the first subset of devices;
      each of the first subset of device signals were sent from a respective mobile device in the first subset of devices while the respective mobile device was within a geographic unit tile assigned to the first group; and
      the second value is based on a second subset of device signals sent by the first subset of devices.

17. The medium of claim 1, the operations further comprising:
   obtaining an input location;
   determining that the input location is in a geographic unit tile associated with the first group; and
   determining a visit rate based on a count of device signals associated with the first group.

18. The medium of claim 1, the operations further comprising:
   determining whether the first geographic unit tile was assigned to the first group as part of a seeding operation; and
   preventing the first geographic unit tile from being re-assigned to a different group in response to a determination that the first geographic unit tile was assigned to the first group as part of the seeding operation.

19. The medium of claim 1, wherein determining the set of weights further comprises:
   obtaining at least one of a selected frequency range; and
   determining the set of weights based on a count of device signals operating at the selected frequency range.

* * * * *